United States Patent
Ohmaru

(10) Patent No.: US 9,467,047 B2
(45) Date of Patent: Oct. 11, 2016

(54) DC-DC CONVERTER, POWER SOURCE CIRCUIT, AND SEMICONDUCTOR DEVICE

(75) Inventor: Takuro Ohmaru, Zama (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 391 days.

(21) Appl. No.: 13/477,588

(22) Filed: May 22, 2012

(65) Prior Publication Data

US 2012/0306467 A1    Dec. 6, 2012

(30) Foreign Application Priority Data

May 31, 2011    (JP) .................................. 2011-121231

(51) Int. Cl.
   *G05F 1/575*    (2006.01)
   *H02M 3/156*    (2006.01)
   (Continued)

(52) U.S. Cl.
   CPC .................................. *H02M 3/157* (2013.01)

(58) Field of Classification Search
   CPC .... G01R 19/0084; G05F 1/62; H02M 3/156; H02M 3/1588; H02M 3/157
   USPC ........ 323/234, 282, 283, 280, 281, 284, 285
   See application file for complete search history.

(56) References Cited

U.S. PATENT DOCUMENTS

| 5,218,607 | A |   | 6/1993  | Saito et al. |        |
|-----------|---|---|---------|--------------|--------|
| 5,528,032 | A |   | 6/1996  | Uchiyama     |        |
| 5,583,412 | A | * | 12/1996 | Nielsen      | 318/811 |

(Continued)

FOREIGN PATENT DOCUMENTS

| CN | 101124678 B | 4/2010  |
|----|-------------|---------|
| EP | 1737044 A   | 12/2006 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters) , Sep. 27, 2004, vol. 85, No. 13, pp. 2541-2543.

(Continued)

*Primary Examiner* — Adolf Berhane
*Assistant Examiner* — Sisay G Tiku
(74) *Attorney, Agent, or Firm* — Eric J. Robinson; Robinson Intellectual Property Law Office, P.C.

(57) ABSTRACT

A DC-DC converter includes a control circuit, a switching element, and a constant-voltage generation portion which generates an output voltage on the basis of an input voltage supplied through the switching element. The control circuit includes AD converters which convert the input voltage and the output voltage, a signal processing circuit, a pulse modulation circuit, and a power supply control circuit which controls supply of a power supply voltage to the signal processing circuit in accordance with digital values of the input voltage and the output voltage. The signal processing circuit determines the duty ratio in accordance with the digital value of the output voltage, and the pulse modulation circuit controls the switching element. The signal processing circuit includes a memory device including a memory element, a capacitor for storing data of the memory element, and a transistor for controlling charge in the capacitor. The transistor includes an oxide semiconductor.

14 Claims, 16 Drawing Sheets

(51) Int. Cl.
*H02M 3/157* (2006.01)
*H02M 3/158* (2006.01)

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 5,870,298 A * | 2/1999 | Hung | 363/98 |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 6,906,932 B2 * | 6/2005 | Kung | H02M 3/33515 323/283 |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,126,514 B2 * | 10/2006 | Kohara | 341/141 |
| 7,202,528 B2 | 4/2007 | Sankin et al. | |
| 7,211,825 B2 | 5/2007 | Shih et al | |
| 7,282,782 B2 | 10/2007 | Hoffman et al. | |
| 7,294,860 B2 | 11/2007 | Mazzola et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,416,929 B2 | 8/2008 | Mazzola et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,504,805 B2 | 3/2009 | Nishida | |
| 7,556,994 B2 | 7/2009 | Sankin et al. | |
| 7,674,650 B2 | 3/2010 | Akimoto et al. | |
| 7,732,819 B2 | 6/2010 | Akimoto et al. | |
| 7,820,511 B2 | 10/2010 | Sankin et al. | |
| 7,982,446 B2 | 7/2011 | Noon et al. | |
| 8,017,981 B2 | 9/2011 | Sankin et al. | |
| 8,148,965 B2 | 4/2012 | Takahashi | |
| 8,330,444 B2 | 12/2012 | Noon et al. | |
| 8,395,366 B2 * | 3/2013 | Uno | 323/284 |
| 8,471,544 B2 | 6/2013 | Takahashi | |
| 8,502,282 B2 | 8/2013 | Sankin et al. | |
| 8,593,856 B2 * | 11/2013 | Koyama | G11C 11/412 365/149 |
| 8,624,650 B2 * | 1/2014 | Ishii | H03K 3/356104 327/202 |
| 8,854,867 B2 * | 10/2014 | Takemura | G11C 11/412 365/149 |
| 8,884,651 B2 | 11/2014 | Yamazaki et al. | |
| 8,952,726 B2 | 2/2015 | Yamazaki et al. | |
| 9,058,892 B2 * | 6/2015 | Yamazaki | |
| 9,059,694 B2 * | 6/2015 | Ishii | H03K 3/356104 |
| 9,183,894 B2 * | 11/2015 | Koyama | G11C 11/412 |
| 9,275,987 B2 * | 3/2016 | Matsuzaki | H01L 27/1225 |
| 9,300,292 B2 * | 3/2016 | Uesugi | H03K 19/0013 |
| 9,331,574 B2 * | 5/2016 | Kurokawa | H02M 3/157 |
| 9,336,845 B2 * | 5/2016 | Ohshima | G11C 11/005 |
| 2001/0038108 A1 * | 11/2001 | Kitabatake et al. | 257/289 |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0043604 A1 * | 3/2003 | Shimizu et al. | 363/37 |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0083050 A1 * | 4/2006 | Perner | 365/145 |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0120138 A1 * | 6/2006 | Liaw et al. | 365/149 |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0001813 A1 * | 1/2009 | Berry et al. | 307/31 |
| 2009/0015228 A1 * | 1/2009 | Sato et al. | 323/283 |
| 2009/0024254 A1 * | 1/2009 | Koike et al. | 700/282 |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2011/0026329 A1 * | 2/2011 | Wada | 365/185.18 |
| 2011/0121878 A1 * | 5/2011 | Kato et al. | 327/215 |
| 2011/0148463 A1 * | 6/2011 | Kato et al. | 326/47 |
| 2011/0148497 A1 * | 6/2011 | Ishii | H03K 3/356104 327/210 |
| 2011/0156024 A1 * | 6/2011 | Koyama | G11C 11/412 257/43 |
| 2011/0194316 A1 * | 8/2011 | Morota | 363/21.17 |
| 2011/0199807 A1 * | 8/2011 | Saito et al. | 365/72 |
| 2011/0304311 A1 | 12/2011 | Takahashi et al. | |
| 2012/0248451 A1 * | 10/2012 | Sone et al. | 257/59 |
| 2012/0300599 A1 * | 11/2012 | Contreras et al. | 369/13.24 |

(56) References Cited

U.S. PATENT DOCUMENTS

| | | | |
|---|---|---|---|
| 2014/0253174 A1* | 9/2014 | Takewaki | 326/41 |
| 2015/0097595 A1 | 4/2015 | Yamazaki et al. | |

FOREIGN PATENT DOCUMENTS

| | | | |
|---|---|---|---|
| EP | 2226847 A | 9/2010 | |
| JP | 60-198861 A | 10/1985 | |
| JP | 63-210022 A | 8/1988 | |
| JP | 63-210023 A | 8/1988 | |
| JP | 63-210024 A | 8/1988 | |
| JP | 63-215519 A | 9/1988 | |
| JP | 63-239117 A | 10/1988 | |
| JP | 63-265818 A | 11/1988 | |
| JP | 05-251705 A | 9/1993 | |
| JP | 06-275697 | 9/1994 | |
| JP | 08-264794 A | 10/1996 | |
| JP | 11-505377 | 5/1999 | |
| JP | 2000-044236 A | 2/2000 | |
| JP | 2000-150900 A | 5/2000 | |
| JP | 2002-076356 A | 3/2002 | |
| JP | 2002-289859 A | 10/2002 | |
| JP | 2003-086000 A | 3/2003 | |
| JP | 2003-086808 A | 3/2003 | |
| JP | 2004-103957 A | 4/2004 | |
| JP | 2004-273614 A | 9/2004 | |
| JP | 2004-273732 A | 9/2004 | |
| JP | 2006-087261 A | 3/2006 | |
| JP | 2006-351141 A | 12/2006 | |
| JP | 2007-318655 A | 12/2007 | |
| JP | 2009-009386 | 1/2009 | |
| JP | 2010-017022 A | 1/2010 | |
| JP | 2010-051066 A | 3/2010 | |
| JP | 2011-103453 A | 5/2011 | |
| TW | 200935714 | 8/2009 | |
| TW | 201025804 | 7/2010 | |
| WO | WO-2004/114391 | 12/2004 | |
| WO | WO-2006/060337 | 6/2006 | |
| WO | WO-2007/001316 | 1/2007 | |
| WO | WO-2009/009380 | 1/2009 | |
| WO | WO-2011/046015 | 4/2011 | |

OTHER PUBLICATIONS

Dembo.H et al., "RFCPUs on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Physl. Lett. (Applied Physics Letters) , Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) , Jun. 17, 1996, vol. 68, No. 25, pp. 3650-3652.

Nakamura.M et al., "The phase relations in the In2O3—Ga2ZnO4—ZnO system at 1350° C.,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '08 : SID International Symposium Digest of Technical Papers, May 31, 2008, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUs on Flexible and Glass Substrates for Secure RFID Systems,", Journal of Solid-State Circuits , 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

(56) References Cited

OTHER PUBLICATIONS

Cho.D et al., "21.2:AL and SN-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium—Oxide—Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.

Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs,", Journal of the SID, 2007, vol. 15, No. 1, pp. 71-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel, YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B. (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

Taiwanese Office Action (Application No. 101118524) Dated Nov. 16, 2015.

* cited by examiner

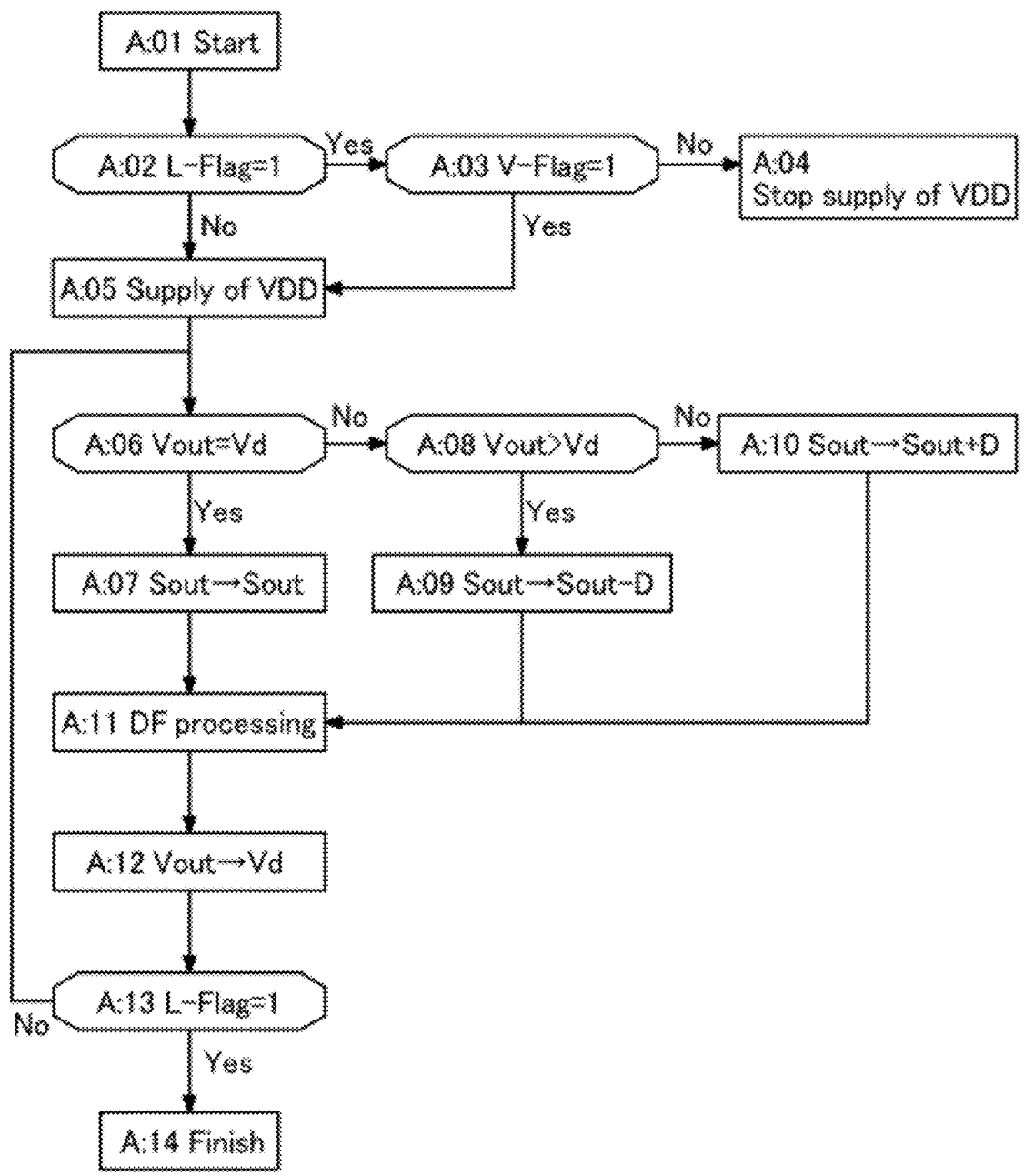

FIG. 10A  FIG. 10B
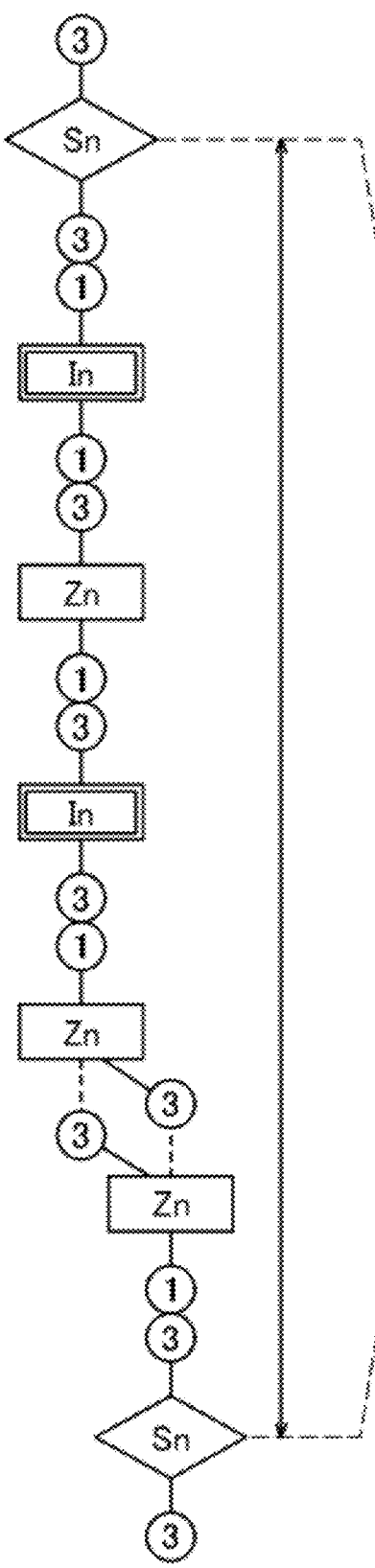
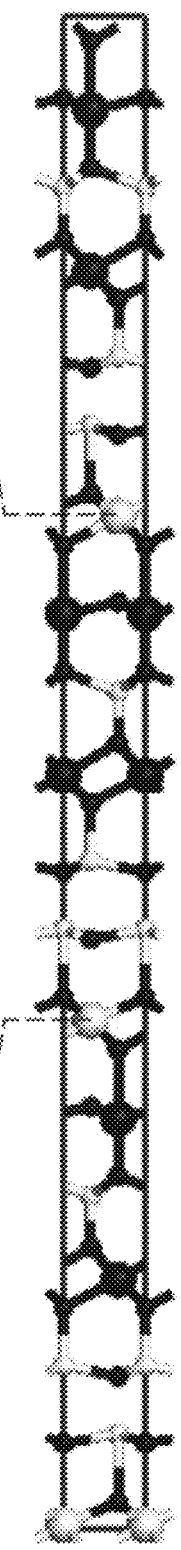
FIG. 10C
● In
○ Sn
○ Zn
• O

● In
○ Ga
○ Zn
● O

DC-DC CONVERTER, POWER SOURCE CIRCUIT, AND SEMICONDUCTOR DEVICE

BACKGROUND OF THE INVENTION

1. Field of the Invention

The present invention relates to a digital DC-DC converter and a power source circuit and a semiconductor device that includes the DC-DC converter.

2. Description of the Related Art

A DC-DC converter is a constant-voltage circuit with which a constant output voltage can be obtained regardless of the value of an input voltage, and the DC-DC converter is used for a power supply circuit together with a rectification circuit or the like. In particular, a power supply circuit including a switching type DC-DC converter is referred to as a switching power source or a switching regulator.

The switching type DC-DC converter outputs a voltage with a predetermined value in such a manner that a voltage with a pulse waveform is formed using an input voltage by a switching element and the voltage is smoothed or held in a coil, a capacitor, or the like. A proportion of a period in which the switching element is on, what is called a duty ratio, is controlled by a control circuit in the DC-DC converter. By the control of the duty ratio using the control circuit, the value of an output voltage can be controlled.

Among DC-DC converters, analog DC-DC converters in which a control circuit is formed using an analog circuit have been the mainstream. However, in recent years, a digital DC-DC converter including a signal processing circuit such as a digital signal processor (the DSP) as a control circuit has been practically used. The digital DC-DC converter can perform high-speed switching of a switching element, have high accuracy of signal processing in the control circuit, and have the control circuit with a simple structure.

Patent Document 1 discloses a power source control in a digital manner.

REFERENCE

Patent Document

[Patent Document 1] Japanese Published Patent Application No. 2009-009386

SUMMARY OF THE INVENTION

When performance of electronic devices is evaluated, one of important points is low power consumption. In particular, in the case of a portable electronic device such as mobile phone, high power consumption leads to short continuous use time, which is a demerit, and therefore low power consumption is strongly required. DC-DC converters are required to reduce power consumption because they are provided in many portable electronic devices for controlling a voltage output from rechargeable batteries.

Patent Document 1 discloses a technique of reducing power consumption by which a DSP is stopped by stopping supply of a clock signal to the DSP when an information processing apparatus is shifted to a power saving mode. However, even when supply of a driving signal such as a clock signal is stopped, a power supply voltage is supplied to an integrated circuit such as DSP, and power is consumed owing to an off-state current of a transistor and the like. Therefore, in order to further reduce power consumption of the DC-DC converter, it is necessary to stop not only supply of the driving signal to the DSP but also supply of the power supply voltage to the DSP.

Note that data of a duty ratio which is held by a register in the DSP is lost when supply of the power supply voltage to the DSP is stopped. When supply of the power supply voltage to the DSP is resumed, a voltage output from the DC-DC converter is prone to be temporarily unstable. In order to prevent the unstable state, data of the duty ratio can be saved in an external non-volatile memory device such as a flash memory before supply of the power supply voltage to the DSP is stopped. However, since it needs a time to restore the data from the external memory device to the register of the DSP, the method is not suitable for stopping supply of the power supply voltage for a short time to reduce power consumption.

In view of the technical background, it is an object of an embodiment of the present invention to provide a DC-DC converter which consumes low power and to provide a power source circuit or a semiconductor device which includes the DC-DC converter. In particular, it is an object to provide a DC-DC converter which consumes low power by stopping supply of the power supply voltage for a short time and to provide a power source circuit or a semiconductor device which includes the DC-DC converter.

In order to solve the above problem, in one embodiment of the present invention, a control circuit includes a memory device with the following structure in a signal processing circuit such as a DSP determining a duty ratio. The memory device includes a memory element, a capacitor for storing data of the memory element, and a transistor for controlling supply, holding, and discharge of charge in the capacitor.

The transistor includes, in a channel formation region, a semiconductor, such as an oxide semiconductor, whose band gap is wider than that of silicon and whose intrinsic carrier density is lower than that of silicon. Therefore, a transistor in which a semiconductor having the above characteristics is used in a channel formation region has much lower off-state current than a transistor formed using a normal semiconductor such as silicon or germanium.

Specifically, the memory element can be formed with the use of a logic element which inverts a logical value of an input signal and outputs the signal, such as an inverter or a clocked inverter.

Further, in an embodiment of the present invention, a power supply control circuit is provided in the control circuit. The power supply control circuit determines in accordance with the levels of an input voltage and an output voltage of the DC-DC converter whether or not supply of the power supply voltage to the signal processing circuit is stopped. Specifically, the power supply control circuit stops supply of the power supply voltage to the signal processing circuit when the output voltage is kept at a desired value and fluctuation of the input voltage is small. Further, the power supply control circuit supplies the power supply voltage to the signal processing circuit when the fluctuation of the input voltage is great or the output voltage is not kept at the desired value.

Data of a duty ratio determined by the signal processing circuit is held in the memory element included in the memory device. The data of the duty ratio held in the memory element is saved in the capacitor included in the memory device before supply of the power supply voltage to the signal processing circuit is stopped. Specifically, the data is saved by holding of charge in the capacitor. The holding of charge is performed by turning off the transistor having low off-state current. After supply of the power supply voltage to the signal processing circuit is resumed, the saved data is restored to the memory element. With the above structure, the data held in the memory device can be prevented from being lost even when supply of the power supply voltage is stopped. Since there is no need to save data in an external memory circuit, supply of the power supply voltage can be stopped even for a short time in the signal processing circuit or the control circuit including the signal processing circuit. As a result, power consumption of the DC-DC converter can be reduced. Further, the data of the duty ratio is held in the memory device even when supply of the power supply voltage is stopped, and therefore, instability of the output voltage of the DC-DC converter can be prevented after supply of the power supply voltage is resumed.

Specifically, a DC-DC converter according to an embodiment of the present invention includes a switching element, a control circuit for controlling the duty ratio of the switching element, and a constant-voltage generation portion which generates an output voltage corresponding to the duty ratio. Supply of an input voltage to the constant-voltage generation portion is controlled by the switching element. The control circuit includes an AD converter which converts an output voltage from an analog value to a digital value; an AD converter which converts an input voltage from an analog value to a digital value; a signal processing circuit which determines the duty ratio with the use of the digital value of the output voltage; a pulse modulation circuit which generates a signal for controlling switching of the switching element in accordance with the duty ratio; and a power supply control circuit which determines whether or not supply of a power supply voltage to the signal processing circuit is performed in accordance with the digital value of the input voltage and the digital value of the output voltage. The signal processing circuit includes a memory device for storing the duty ratio. The memory device includes a memory element formed with the use of a transistor including, in a channel formation region, a semiconductor such as silicon having crystallinity or germanium having crystallinity, a capacitor for storing data of the memory element, and a transistor for controlling supply, holding, and discharge of charge in the capacitor. The transistor includes, in a channel formation region, a semiconductor whose band gap is wider than that of silicon and whose intrinsic carrier density is lower than that of silicon.

An embodiment of the present invention can provide a DC-DC converter capable of operating with low power because of the above structure, and a power source circuit and a semiconductor device that include the DC-DC converter.

BRIEF DESCRIPTION OF THE DRAWINGS

FIG. 2 is a flowchart illustrating operation of a DC-DC converter.

FIGS. 10A to 10C are diagrams showing a structure of an oxide semiconductor.

DETAILED DESCRIPTION OF THE INVENTION

Hereinafter, embodiments of the present invention will be described in detail with reference to the accompanying drawings. However, the present invention is not limited to the following description and it is easily understood by those skilled in the art that the mode and details can be variously changed without departing from the scope and spirit of the present invention. Accordingly, the invention should not be construed as being limited to the description of the embodiments below.

Note that the present invention includes, in its category, all the semiconductor devices in which a DC-DC converter or a power supply circuit can be used: for example, integrated circuits such as microprocessors and image processing circuits, RF tags, memory media, solar cells, lighting devices including light-emitting elements, and semiconductor display devices. Further, the semiconductor display devices include semiconductor display devices including the DC-DC converter and the power supply circuit, such as liquid crystal display devices, lighting devices in which a light-emitting element typified by an organic light-emitting element (OLED) is provided for each pixel, electronic paper, digital micromirror devices (DMD), plasma display panels (PDP), field emission displays (FED), and the like, in its category.

Embodiment 1

Figure 1A:
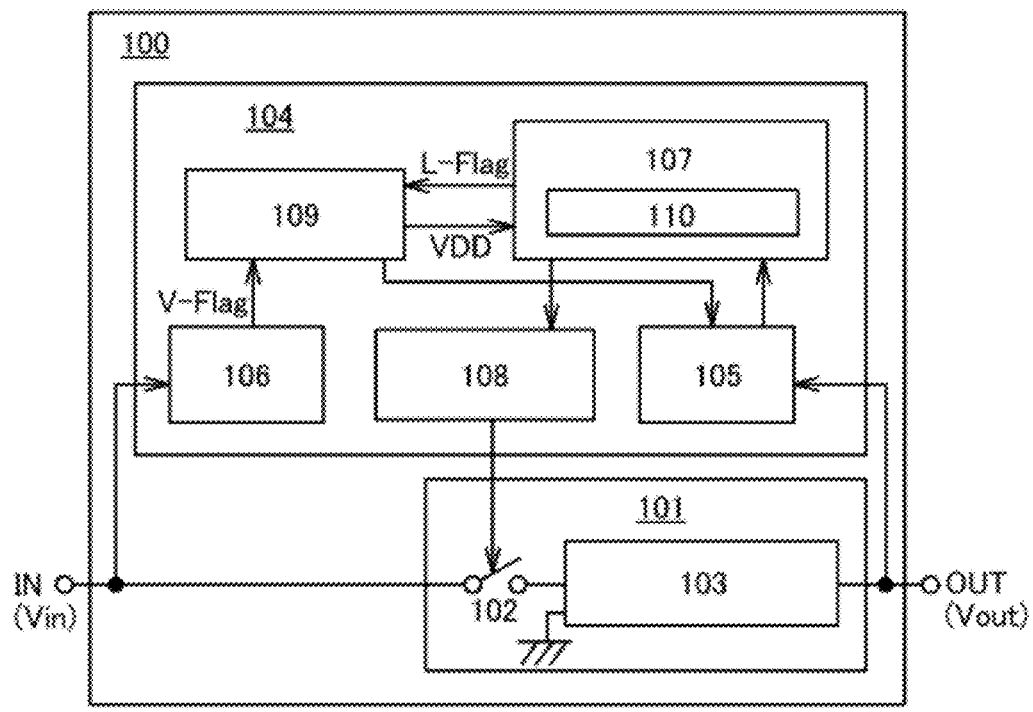
FIG. 1A illustrates a configuration of a DC-DC converter and FIG. 1B illustrates a configuration of a memory device.

FIG. 1A illustrates an example of a structure of a DC-DC converter according to an embodiment of the present invention.

A DC-DC converter 100 illustrated in FIG. 1A includes a power conversion circuit 101 which generates a constant output voltage (Vout) by the use of input voltage applied to an input terminal IN (Vin) and outputs the constant voltage from an output terminal OUT. A power conversion circuit 101 includes a constant-voltage generation portion 103 and a switching element 102. The DC-DC converter 100 illustrated in FIG. 1A includes a control circuit 104 for controlling the proportion of time in which the switching element 102 is on, i.e., a duty ratio.

The switching element 102 performs switching in accordance with a duty ratio determined by the control circuit 104. When the switching element 102 is on, the input voltage is supplied to the constant-voltage generation portion 103. When the switching element 102 is off, the input voltage Vin is not supplied to the constant-voltage generation portion 103. When the switching element 102 is turned off, the constant-voltage generation portion 103 is supplied with reference voltage such as ground voltage. Therefore, in response to the switching of the switching element 102, a pulsed signal in which the reference voltage and a fixed voltage are alternated is supplied to the constant-voltage generation portion 103.

The constant-voltage generation portion 103 includes any one or more of a coil, a capacitor, and a diode. When a pulsed signal is supplied, the constant-voltage generation portion 103 generates a constant-output voltage by smoothing or holding the voltage of the signal.

When the duty ratio determined by the control circuit 104 is changed, a value of output voltage is also changed. Specifically, the increase in percentage of periods in which pulses of the input voltage are generated results in the increase in difference between the output voltage and reference voltage. In contrast, the decrease in percentage of periods when pulses of input voltage are generated leads to the decrease in difference between output voltage and reference voltage.

Note that in an embodiment of the present invention, the switching of the switching element 102 may be performed by pulse width control (PWM) or pulse frequency control (PFM).

Alternatively in an embodiment of the present invention, the output voltage may be adjusted by a combination of the pulse width control and the pulse frequency control which are utilized for the switching of the switching element 102. In the case of low output voltage, the frequency of the switching of the switching element 102 can be suppressed to be low by the pulse frequency control rather than by the pulse width control; accordingly, the power loss due to the switching of the switching element 102 is suppressed to be low. In contrast, in the case of high output voltage, the frequency of the switching of the switching element 102 can be suppressed to be low by the pulse width control rather than by the pulse frequency control; accordingly, power loss due to the switching of the switching element 102 is suppressed to be low. Therefore, the pulse width control and the pulse frequency control may be switched depending on the amount of the output voltage, whereby power conversion efficiency can be enhanced.

The control circuit 104 includes an AD converter 105, an AD converter 106, a signal processing circuit 107, a pulse modulation circuit 108, and a power supply control circuit 109. The signal processing circuit 107 includes a memory device 110.

The AD converter 105 has a function of converting the output voltage Vout from an analog value to a digital value. The signal processing circuit 107 has a function of determining a duty ratio with the use of the digital value of the output voltage Vout. Data of the determined duty ratio is held in the memory device 110 of the signal processing circuit 107. The pulse modulation circuit 108 has a function of generating a control signal for controlling the switching of the switching element 102 in accordance with the duty ratio. The AD converter 106 has a function of converting the input voltage Vin from an analog value to a digital value. The power supply control circuit 109 has a function of determining whether or not a power supply voltage VDD is supplied to the signal processing circuit 107 in accordance with the digital value of the input voltage Vin and the digital value of the output voltage Vout.

Figure 1B:
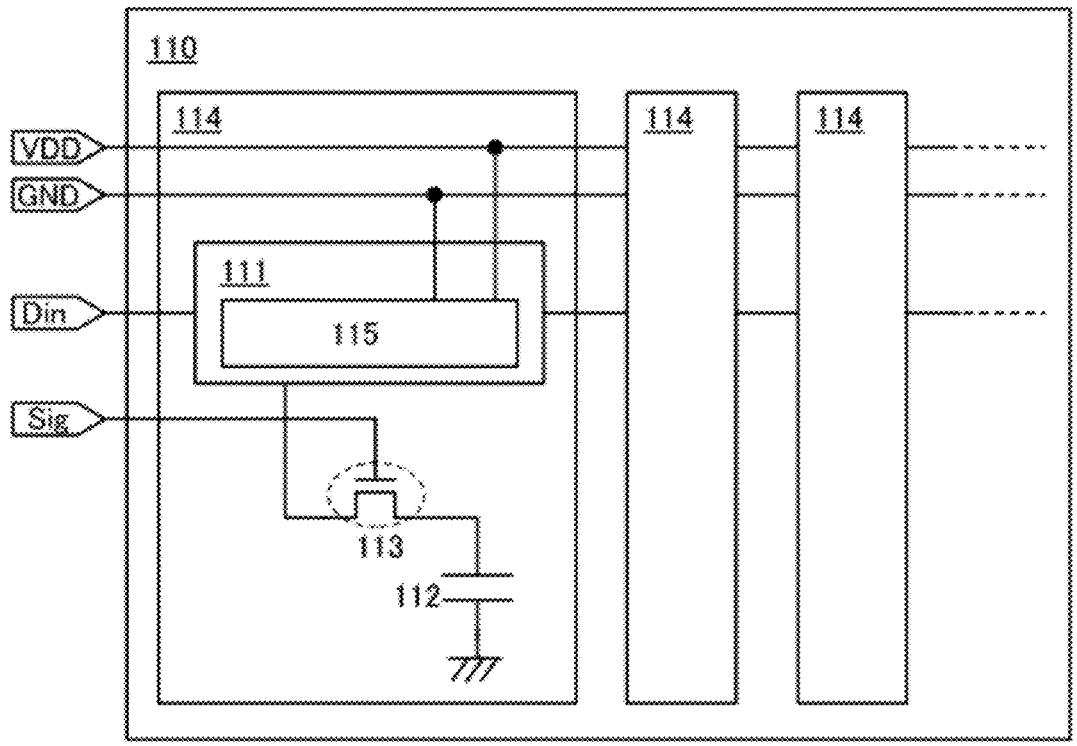

Next, a block diagram in FIG. 1B shows an example of a configuration of the memory device 110. As illustrated in FIG. 1B, the memory device 110 includes a memory element 111, a capacitor 112 for storing data of the memory element 111, and the transistor 113 for controlling supply, holding, discharge of charge in the capacitor 112. The memory element 111 includes a plurality of logic elements 115 which invert a logical value of an inputted signal and outputs the signal. A memory cell 114 can hold one-bit data with the memory element 111, the capacitor 112, and the transistor 113. The memory device 110 includes one or more memory cells 114.

Note that an inverter, a clocked inverter, or the like can be used for the logic element 115.

Note that the memory cell 114 may further include another circuit element such as a diode, a resistor, or an inductor, as needed.

When one-bit data of the duty ratio which is included in a signal Din is input to the memory cell 114 in the first stage, the data is input to the memory element 111. The memory element 111 holds the data as long as a reference voltage GND and the high-level power supply voltage VDD are supplied. Then, when the one-bit data is input to the memory cell 114 in the subsequent stage, next one-bit data of the duty ratio which is included in the signal Din is input to the memory cell 114 in the first stage. By repetition of the above operation, all of the one-bit data which is included in the signal Din is held in the plurality of memory cells 114.

The capacitor 112 is connected to the memory element 111 through the transistor 113 so as to store data of the signal Din input to the memory cell 114 as necessary. Specifically, the capacitor 112 has a dielectric substance sandwiched between a pair of electrodes. One of the pair of electrodes is connected to the memory element 111 through the transistor 113 and the other is connected to a node applied to a reference voltage such as a ground voltage. Switching of the transistor 113 is controlled by a signal Sig applied to a gate electrode thereof.

Note that the power supply control circuit 109 illustrated in FIG. 1A determines, as described above, whether or not the power supply voltage VDD is supplied to the signal processing circuit 107 in accordance with the digital value of the input voltage Vin and the digital value of the output voltage Vout. Specifically, when the output voltage Vout is kept at a desired value and fluctuation of the input voltage Vin is small, the power supply control circuit 109 stops supply of the power supply voltage VDD to the signal processing circuit 107. When fluctuation of the input voltage Vin is great or the output voltage Vout is not kept at the desired value, the power supply control circuit 109 supplies the power supply voltage VDD to the signal processing circuit 107.

Then, when the power supply control circuit 109 stops supply of the power supply voltage VDD to the signal processing circuit 107, the data of the duty ratio stored in the memory element 111 is saved in the capacitor 112 of the memory device 110 before supply of the power supply voltage VDD is stopped. Specifically, data is saved by holding of charge in the capacitor 112 and the charge is held by turning off the transistor 113 having low off-state current. After supply of the power supply voltage VDD to the signal processing circuit 107 is resumed, the saved data is restored to the memory element 111. With the above structure, the data of the duty ratio which is held in the memory device 110 can be prevented from being lost by stop of supply of the power supply voltage VDD.

An example of specific operation of the DC-DC converter 100 with the configurations illustrated in FIGS. 1A and 1B is described with reference to a flowchart in FIG. 2.

First, determination of whether or not supply of the power supply voltage VDD to the signal processing circuit 107 is stopped is started and adjustment of the output voltage Vout is started (A:01 Start). The determination may be started in accordance with an instruction input from the outside of the DC-DC converter 100 or may be set to be automatically started at a predetermined timing. Note that the power supply voltage VDD has been already supplied to the signal processing circuit 107 before whether or not supply of the power supply voltage VDD to the signal processing circuit 107 is stopped is determined and the output voltage Vout is adjusted.

The signal processing circuit 107 compares the digital value of the output voltage Vout output from the AD converter 105 and a digital value of a desired output voltage Vd. Then, a signal L-Flag which has the result of determining whether or not the output voltage Vout is kept at the value of the desired output voltage Vd as data is output from the signal processing circuit 107. Further, the AD converter 106 generates the digital value of the input voltage Vin and outputs a signal V-Flag which has the result of determining whether or not the input voltage Vin fluctuates as data.

For example, it is assumed that: when the digital value of the signal L-Flag is 1, the output voltage Vout is kept at the value of the desired output voltage Vd. When the digital value of the signal L-Flag is 0, the output voltage Vout is not kept at the value of the desired output voltage Vd. For example when the digital value of the signal V-Flag is 1, the input voltage Vin fluctuates. When the digital value of the signal V-Flag is 0, the input voltage Vin does not fluctuate.

In the power supply control circuit 109, whether or not the power supply voltage VDD is supplied to the signal processing circuit 107 is determined in accordance with the digital value of the signal L-Flag and the digital value of the signal V-Flag. Specifically, whether or not the digital value of the signal L-Flag is 1 is determined (A:02 L-Flag=1) and whether or not the digital value of the signal V-Flag is 1 is determined (A:03 V-Flag=1). When the digital value of the signal L-Flag is 1 and the digital value of the signal V-Flag is 0, supply of the power supply voltage VDD to the signal processing circuit 107 is stopped (A:04 Stop supply of VDD). In addition, when the digital value of the signal L-Flag is 0 or when the digital value of the signal L-Flag and the digital value of the signal V-Flag are 1, the power supply voltage VDD is supplied to the signal processing circuit 107 (A:05 Supply VDD).

Note that when the digital value of the signal L-Flag is 1 and the digital value of the signal V-Flag is 1, the output voltage Vout needs to be brought close to the value of the desired output voltage Vd in consideration of fluctuation of the input voltage Vin. When the digital value of the signal L-Flag is 0 and the digital value of the signal V-Flag is 1 or 0, regardless of fluctuation of the input voltage Vin, the output voltage Vout is not kept at the value of the desired output voltage Vd; therefore, the output voltage Vout needs to be brought close to the value of the desired output voltage Vd. In the signal processing circuit 107, the duty ratio is determined in accordance with the result of comparison between the digital value of the output voltage Vout output from the AD converter 105 and the digital value of the desired output voltage Vd.

Specifically, in the signal processing circuit 107, whether or not the output voltage Vout corresponds to the value of the desired output voltage Vd is determined (A:06 Vout=Vd). In the case where the output voltage Vout corresponds to the value of the desired output voltage Vd, a digital value Sout of the output voltage is not corrected (A:07 Sout→Sout). That is, in this case, the digital value Sout before correction is equal to a digital value Sout' after the correction.

In the case where the output voltage Vout does not correspond to the value of the desired output voltage Vd, whether or not the output voltage Vout is higher than the value of the desired output voltage Vd is determined (A:08 Vout>Vd). When the output voltage Vout is higher than the value of the desired output voltage Vd, the digital value Sout is corrected in such a manner that a correction value D is subtracted from the digital value Sout of the output voltage so as to make the duty ratio small, so that the digital value Sout'=Sout-D is generated (A:09 Sout→Sout-D).

When the output voltage Vout is lower than the value of the desired output voltage Vd, the digital value Sout is corrected in such a manner that the correction value D is added to the digital value Sout of the output voltage so as to make the duty ratio large, so that the digital value Sout'=Sout+D is generated (A:10 Sout→Sout+D).

Next, in the signal processing circuit 107, the digital value Sout' after the correction is subjected to digital filter processing (A:11 DF processing) and a signal including the digital value Sout' after digital filter processing as data is transmitted to the pulse modulation circuit 108. Note that as data, the digital value Sout' includes a duty ratio needed to obtain the value of the desired output voltage Vd. The pulse modulation circuit 108 generates a control signal for controlling the switching element 102 in accordance with the signal transmitted from the signal processing circuit 107 so that the switching element 102 performs switching in accordance with a desired duty ratio.

In the power conversion circuit 101, the output voltage Vout is adjusted to be brought close to the value of the desired output voltage Vd (A:12 Vout→Vd) by the switching of the switching element 102 in accordance with the control signal.

Note that after the output voltage Vout is adjusted, the signal processing circuit 107 compares the digital value of the output voltage Vout output from the AD converter 105 and the desired digital value of the output voltage Vd again. Then, the signal L-Flag including the result of determining whether or not the output voltage Vout is kept at the value of the desired output voltage Vd as data is output from the signal processing circuit 107.

In the power supply control circuit 109, whether or not the output voltage Vout is brought close to the value of the desired output voltage Vd is determined in accordance with the digital value of the signal L-Flag. Specifically, whether or not the digital value of the signal L-Flag is 1 (A:13 L-Flag=1) is determined. When the digital value of the signal L-Flag is 1, determination of whether or not supply of the power supply voltage VDD to the signal processing circuit 107 is stopped is finished and adjustment of the output voltage Vout is finished (A:14 Finish). When the digital value of the signal L-Flag is 0, the duty ratio is determined again in the signal processing circuit 107 in accordance with the result of comparison between the digital value of the output voltage Vout output from the AD converter 105 and the digital value of the value of the desired output voltage Vd. Specifically, the DC-DC converter 100 repeats again from the operation where the signal processing circuit 107 determines whether or not the output voltage Vout corresponds to the value of the desired output voltage Vd (A:06 Vout=Vd) to the operation where the signal processing circuit 107 determines whether or not the digital value of the signal L-Flag is 1 (A:13 L-Flag=1). Note that the number of repetitions can be determined by a designer as appropriate.

Since there is no need to save data in an external memory circuit in an embodiment of the present invention, supply of the power supply voltage VDD can be stopped even for a short time in the signal processing circuit 107. Consequently, power consumption of the DC-DC converter 100 can be reduced. Further, because data of the duty ratio is stored in the memory device 110 even when supply of the power supply voltage VDD is stopped, instability of the output voltage Vout of the DC-DC converter 100 can be prevented even after supply of the power supply voltage is resumed.

In the above manner, power consumption of the DC-DC converter 100 due to off-state current can be dramatically reduced, and power consumption of a power source circuit or a semiconductor device which includes the DC-DC converter 100 can be low.

Note that in an example described with reference to FIGS. 1A and 1B, and FIG. 2, the power supply control circuit 109 stops supply of the power supply voltage VDD to the signal processing circuit 107 when the output voltage Vout is kept at a desired value and fluctuation of the input voltage Vin is small. However, in an embodiment of the present invention, the power supply control circuit 109 may stop not only supply of the power supply voltage VDD to the signal processing circuit 107 but also supply of the power supply voltage VDD to the AD converter 105. With such a structure, power consumption of the DC-DC converter 100 can be further reduced.

In one embodiment of the present invention, the transistor 113 has a channel formation region which includes a semiconductor whose band gap is wider than that of silicon and whose intrinsic carrier density is lower than that of silicon, such as an oxide semiconductor. A transistor in which an oxide semiconductor is used in a channel formation region has much lower off-state current than a transistor which includes a normal semiconductor such as silicon or germanium. The length of a data holding time of the capacitor 112 depends on the amount of charge, which is accumulated in the capacitor 112, leaking through the transistor 113. Accordingly, when charge accumulated in the capacitor 112 is held by the transistor 113 having extremely low off-state current, such as the transistors described above, leakage of charge from the capacitor 112 can be prevented, and thus, the data holding time can be made longer.

Unless otherwise specified, in the case of an n-channel transistor, off-state current in this specification is current which flows between a source and a drain when a voltage of the drain is higher than that of the source or that of a gate electrode while the voltage of the gate electrode is less than or equal to zero when a reference voltage is the voltage of the source. Alternatively, in the case of a p-channel transistor, off-state current in this specification is current which flows between a source and a drain when a voltage of the drain is lower than that of the source and that of a gate electrode while the voltage of the gate electrode is greater than or equal to zero when a reference voltage is the voltage of the source.

Although FIG. 1B illustrates examples of the case where the transistor 113 has a single-gate structure, the transistor 113 may have a multi-gate structure in which a plurality of electrically connected gate electrodes are included so that a plurality of channel formation regions are included.

Although FIG. 1B illustrates the configuration in which one transistor 113 is used to control supply, holding, and discharge of charge in the capacitor 112, the present invention is not limited thereto. In an embodiment of the present invention, the plurality of transistors 113 may be used to control supply, holding, and discharge of charge in the capacitor 112. In the case of using the plurality of transistors 113, the plurality of transistors 113 may be connected to each other in parallel, in series, or in combination of a parallel connection and a series connection.

Note that in this specification, the state in which transistors are connected to each other in series means the state in which only one of a source and a drain of a first transistor is connected to only one of a source and a drain of a second transistor. In addition, the state in which transistors are connected to each other in parallel means the state in which one of a source and a drain of a first transistor is connected to one of a source and a drain of a second transistor and the other of the source and the drain of the first transistor is connected to the other of the source and the drain of the second transistor.

The terms "source" and "drain" of a transistor interchange with each other depending on the polarity of the transistor or a difference between levels of voltages applied to the source and the drain. In general, as for a source and a drain in an n-channel transistor, one to which a lower voltage is applied is called a source, and one to which a higher voltage is applied is called a drain. Further, as for a source and a drain in a p-channel transistor, one to which a lower voltage is supplied is called a drain, and one to which a higher voltage is supplied is called a source. In this specification, although connection relation of the transistor is described assuming that the source and the drain are fixed in some cases for convenience, actually, the names of the source and the drain interchange with each other depending on the relation of the voltages.

In an embodiment of the present invention, a transistor included in the memory element 111 may include a semiconductor such as silicon having crystallinity or germanium having crystallinity in a channel formation region. Alternatively, the transistor may include a semiconductor whose band gap is wider than that of silicon and whose intrinsic carrier density is lower than that of silicon, such as an oxide semiconductor, in a channel formation region, like the transistor 113. When silicon having crystallinity or germanium having crystallinity has higher mobility than an oxide semiconductor, in the case where the transistor included in the memory element 111 includes silicon having crystallinity or germanium having crystallinity in a channel formation region, high-speed operation of the memory device 110, moreover, the DC-DC converter 100 can be ensured.

The duty ratio of the switching element 102 is controlled with the use of only the output voltage Vout in FIG. 1A; however, in the DC-DC converter according to an embodiment of the present invention, the duty ratio of the switching element 102 may be controlled with the use of not only the output voltage Vout but also an output current.

Figure 16:
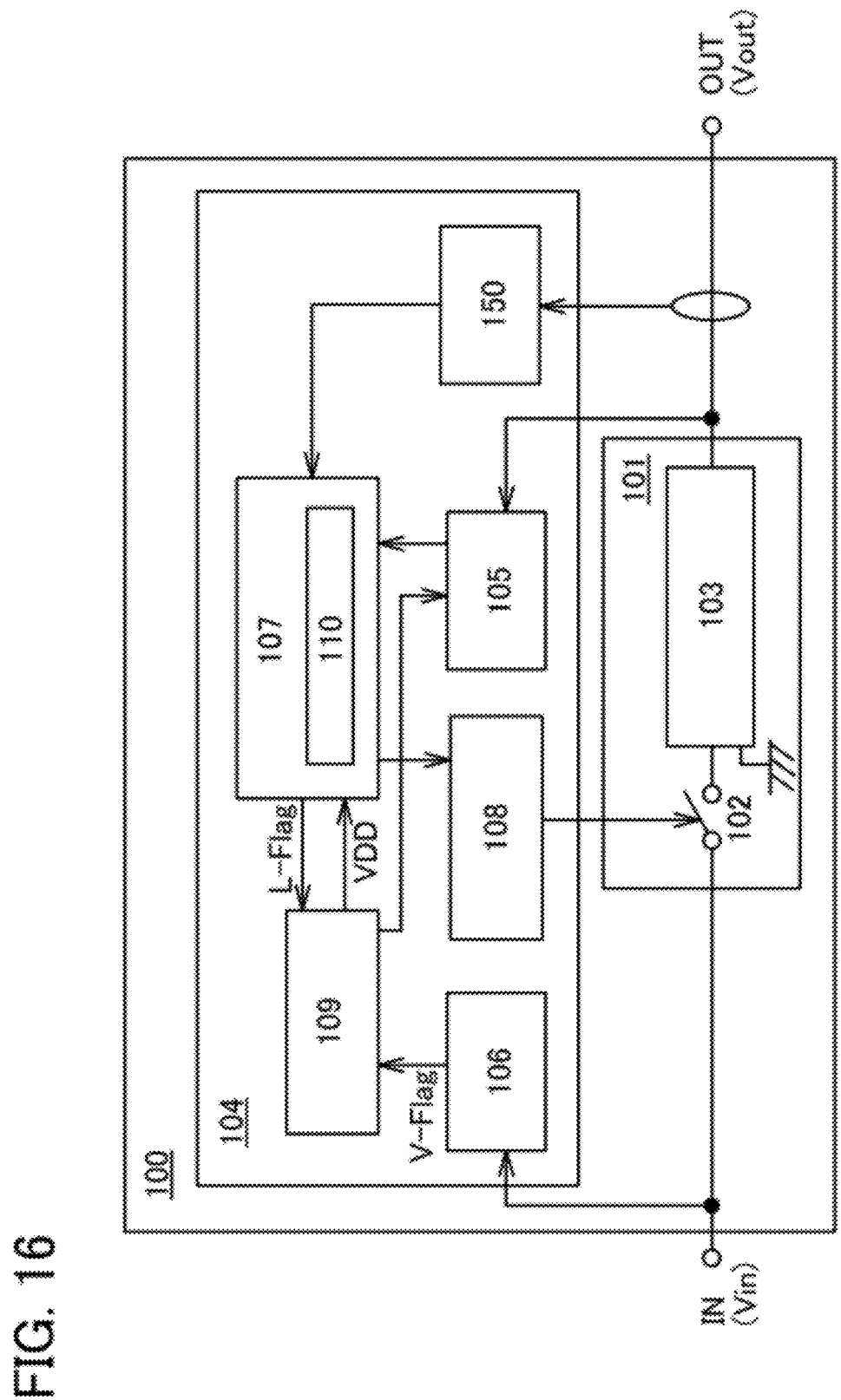
FIG. 16 illustrates a configuration of a DC-DC converter.

FIG. 16 illustrates an example of a configuration of the DC-DC converter 100 according to an embodiment of the present invention. The DC-DC converter 100 illustrated in FIG. 16 is different from the DC-DC converter 100 illustrated in FIG. 1A in that the control circuit 104 includes an AD converter 150. The AD converter 150 converts an output current detected by a CT (current transformer) sensor or the like from an analog value to a digital value and then transmits the digital value to the signal processing circuit 107. In the DC-DC converter 100, the duty ratio of the switching element 102 is controlled in accordance with the digital value of the output voltage Vout and the digital value of the output current.

The output voltage Vout and the output current of the DC-DC converter 100 are detected and the duty ratio is controlled in accordance with these digital values, so that the duty ratio can be set at a proper value to keep the output voltage of the DC-DC converter and the output power of the DC-DC converter at desired values.

Embodiment 2

In this embodiment, configurations of a signal processing circuit and a memory device included in a signal processing circuit are described.

Figure 3:
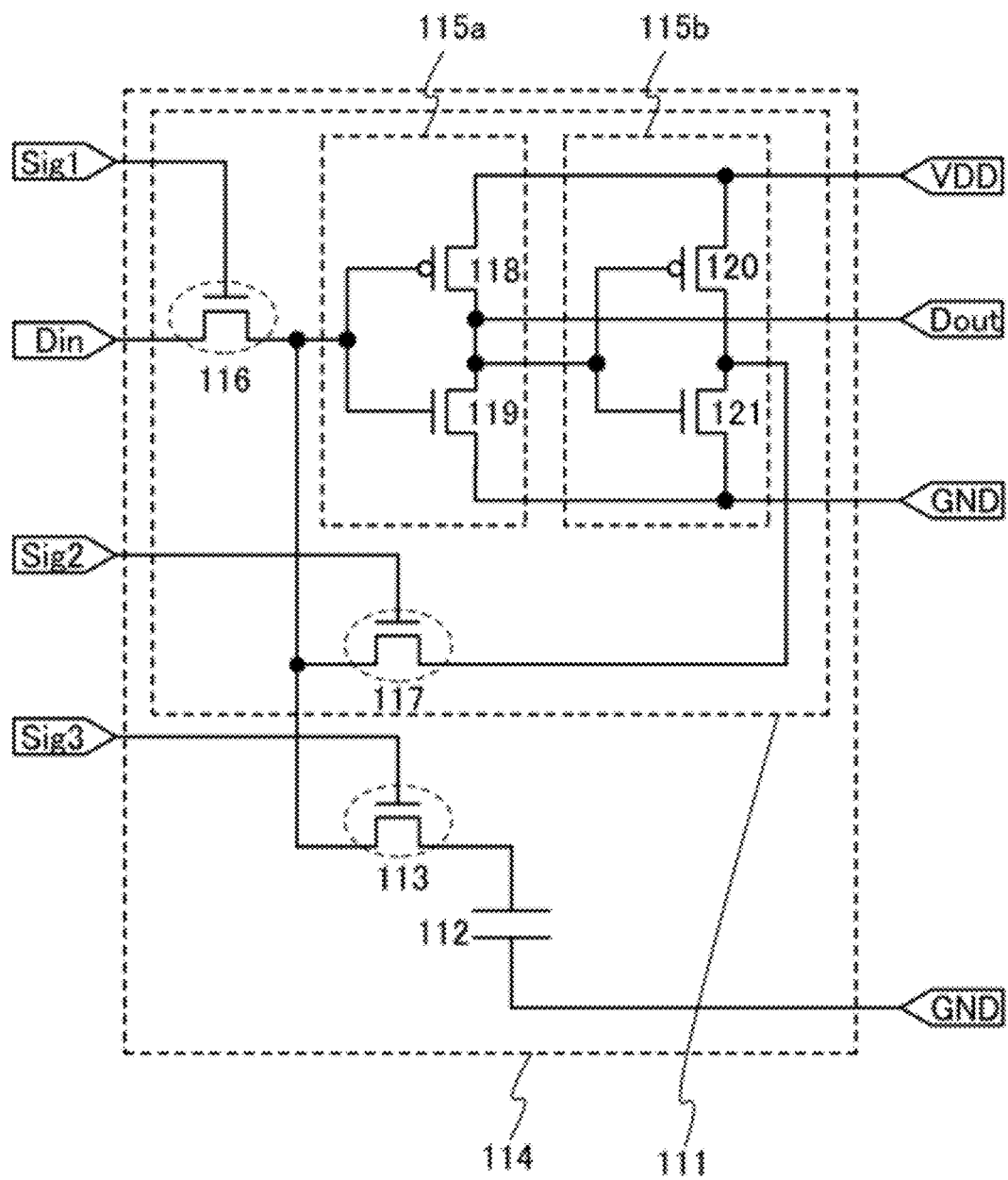
FIG. 3 is a circuit diagram of a memory circuit.

In an embodiment of the present invention, a memory device includes one or a plurality of memory cells each capable of storing one-bit data. FIG. 3 illustrates an example of a circuit diagram of the memory cell 114 included in the memory device.

A memory cell 114 illustrated in FIG. 3 includes a memory element 111, a capacitor 112, and a transistor 113. The memory element 111 includes a first logic element 115a and a second logic element 115b each of which inverts a logical value of a signal input and outputs the signal, a transistor 116, and a transistor 117.

A signal Din including data that is input to the memory cell 114 is supplied to an input terminal of the first logic element 115a through the transistor 116. An output terminal of the first logic element 115a is connected to an input terminal of the second logic element 115b. An output terminal of the second logic element 115b is connected to the input terminal of the first logic element 115a through the transistor 117. A voltage of the output terminal of the first logic element 115a or the input terminal of the second logic element 115b is output as a signal Dout to the memory cell 114 of a subsequent stage or another circuit.

Note that in FIG. 3, an example in which inverters are used as the first logic element 115a and the second logic element 115b is illustrated; however, a clocked inverter can also be used as the first logic element 115a and/or the second logic element 115b besides the inverter.

The capacitor 112 is connected to an input terminal of the memory cell 114, i.e., a node to which a voltage of the signal Din is supplied, through the transistor 116 and the transistor 113 so that the data of the signal Din that is input to the memory cell 114 can be stored as needed. Specifically, one of the electrodes of the capacitor 112 is connected to the input terminal of the first logic element 115a through the transistor 113. The other of the electrodes is connected to a node to which a reference voltage such as a ground voltage is supplied.

The transistor 113 has much lower off-state current than a transistor which includes a normal semiconductor such as silicon or germanium. The length of a data holding time of the capacitor 112 depends on the amount of charge, which is accumulated in the capacitor 112, leaking through the transistor 113. Accordingly, when charge accumulated in the capacitor 112 is held by the transistor 113 having extremely low off-state current, such as the transistors described above, leakage of charge from the capacitor 112 can be prevented, and thus, the data holding time can be made to be longer.

Although FIG. 3 illustrates the example of the case where the transistor included in the transistor 113 has a single-gate structure, the transistor may have a multi-gate structure in which a plurality of electrically connected gate electrodes are included so that a plurality of channel formation regions are included.

Note that in FIG. 3, a structure in which supply, holding, and discharge of charge in the capacitor 112 are controlled with the use of one transistor 113 is illustrated; however, the present invention is not limited to this structure. In an embodiment of the present invention, supply, holding, and discharge of charge in the capacitor 112 may be controlled with the use of the plurality of transistors 113. In the case where the plurality of transistors 113 are used, the plurality of transistors may be connected to each other in parallel, in series, or in combination of parallel connection and series connection.

Note that the memory cell 114 may further include another circuit element such as a diode, a resistor, or an inductor, as needed.

The first logic element 115a has a structure in which a p-channel transistor 118 and an n-channel transistor 119 whose gate electrodes are connected to each other are connected in series between a first node to which the high-level power supply voltage VDD is supplied and a second node to which a low-level reference voltage GND is supplied. Specifically, a source of the p-channel transistor 118 is connected to the first node to which the power supply voltage VDD is supplied, and a source of the n-channel transistor 119 is connected to the second node to which the reference voltage GND is supplied. In addition, a drain of the p-channel transistor 118 is connected to a drain of the n-channel transistor 119, and voltages of the two drains can be regarded as a voltage of the output terminal of the first logic element 115a. In addition, voltages of the gate electrode of the p-channel transistor 118 and the gate electrode of the n-channel transistor 119 can be regarded as a voltage of the input terminal of the first logic element 115a.

The second logic element 115b has a structure in which a p-channel transistor 120 and an n-channel transistor 121 whose gate electrodes are connected to each other are connected in series between the first node to which the high-level power supply voltage VDD is supplied and the second node to which the low-level reference voltage GND is supplied. Specifically, a source of the p-channel transistor 120 is connected to the first node to which the power supply voltage VDD is supplied, and a source of the n-channel transistor 121 is connected to the second node to which the reference voltage GND is supplied. In addition, a drain of the p-channel transistor 120 is connected to a drain of the n-channel transistor 121, and voltages of the two drains can be regarded as a voltage of the output terminal of the second logic element 115b. In addition, voltages of the gate electrode of the p-channel transistor 120 and the gate electrode of the n-channel transistor 121 can be regarded as a voltage of the input terminal of the second logic element 115b.

Switching of the transistor 116 is controlled by a signal Sig 1 applied to a gate electrode thereof. Switching of the transistor 117 is controlled by a signal Sig 2 applied to a gate electrode thereof. Switching of the transistor included in the transistor 113 is controlled by a signal Sig 3 applied to a gate electrode thereof.

In the memory cell 114 illustrated in FIG. 3, a switching element including a plurality of transistors can be used instead of the transistor 116. In the case where a switching element including a plurality of transistors is used instead of the transistor 116, the plurality of transistors may be connected to each other in parallel, in series, or in combination of parallel connection and series connection. Further, in the memory cell 114 illustrated in FIG. 3, a switching element including a plurality of transistors can be used instead of the transistor 117. In the case where a switching element including a plurality of transistors is used instead of the transistor 117, the plurality of transistors may be connected to each other in parallel, in series, or in combination of parallel connection and series connection.

The first logic element 115a and the second logic element 115b are required to operate at high speed. Therefore, a transistor including a channel formation region including silicon having crystallinity or germanium having crystallinity are used as the n-channel transistor 119 and the p-channel transistor 118 included in the first logic element 115a or the n-channel transistor 121 and the p-channel transistor 120 included in the second logic element 115b.

Note that the transistor 116 or the transistor 117 may include a channel formation region including silicon having crystallinity or germanium having crystallinity.

Next, an example of the operation of the memory cell 114 illustrated in FIG. 3 is described.

First, in writing of data, the transistor 116 is turned on, the transistor 117 is turned off, and the transistor 113 is turned off. Then, the power supply voltage VDD is applied to the first node and the reference voltage GND is applied to the second node, whereby the power supply voltage is applied to the memory cell 111. The voltage of the signal Din applied to the memory cell 114 is applied to the input terminal of the first logic element 115a through the transistor 116, whereby the voltage of the output terminal of the first logic element 115a is a voltage which is inverted a logical value of the signal Din. Then, the transistor 117 is turned on and the input terminal of the first logic element 115a is connected to the output terminal of the second logic element 115b, whereby data is written into the first logic element 115a and the second logic element 115b.

Next, in the case where the input data is held in the first logic element 115a and the second logic element 115b, the transistor 117 remains on, the transistor 113 remains off, and the transistor 116 is turned off. By turning off the transistor 116, the input data is held in the first logic element 115a and the second logic element 115b. At this time, the power supply voltage VDD is applied to the first node and the reference voltage GND is applied to the second node, whereby the state in which the power supply voltage is applied between the first node and the second node is maintained.

The voltage of the output terminal of the first logic element 115a reflects the data held in the first logic element 115a and the second logic element 115b. Therefore, by reading out the voltage, the data can be read out from the memory cell 114.

Note that when supply of the power supply voltage is stopped in holding data, the data is held in the capacitor 112 before supply of the power supply voltage is stopped. In the case where the data is held in the capacitor 112, first, the transistor 116 is turned off, the transistor 117 is turned on, and the transistor 113 is turned on. Then, through the transistor 113, the amount of charge corresponding to the value of the data held in the first logic element 115a and the second logic element 115b is accumulated in the capacitor 112, whereby the data is written into the capacitor 112. After the data is stored in the capacitor 112, the transistor 113 is turned off, whereby the data stored in the capacitor 112 is held. After turning off the transistor 113, for example, the reference voltage GND is supplied to each of the first node and the second node so that the nodes have equal voltages, whereby the application of the power supply voltage between the first node and the second node is stopped. Note that after the data is stored in the capacitor 112, the transistor 117 may be turned off.

In such a manner, in the case where the input data is held in the capacitor 112, the application of the power supply voltage between the first node and the second node is unnecessary; therefore, the off-state current flowing between the first node and the second node through the p-channel transistor 118 and the n-channel transistor 119 which are included in the first logic element 115a, or through the p-channel transistor 120 and the n-channel transistor 121 which are included in the second logic element 115b can be extremely close to zero. As a result, power consumption due to the off-state current of the memory element 111 in holding the data can be significantly reduced, and the power consumption of the memory device and further the whole DC-DC converter including the memory device can be reduced.

As described above, the transistor 113 has extremely low off-state current. Therefore, when the transistor 113 is in an off state, charge accumulated in the capacitor 112 does not easily leak; thus, the data is held.

In the case where the data stored in the capacitor 112 is read out, the transistor 116 is turned off. Then, the power supply voltage VDD is again supplied to the first node and the reference voltage GND is again supplied to the second node, whereby the power supply voltage is applied between the first node and the second node. Then, by turning on the transistor 113, the signal Dout having a voltage that reflects the data can be read out from the memory cell 114.

Figure 4A:
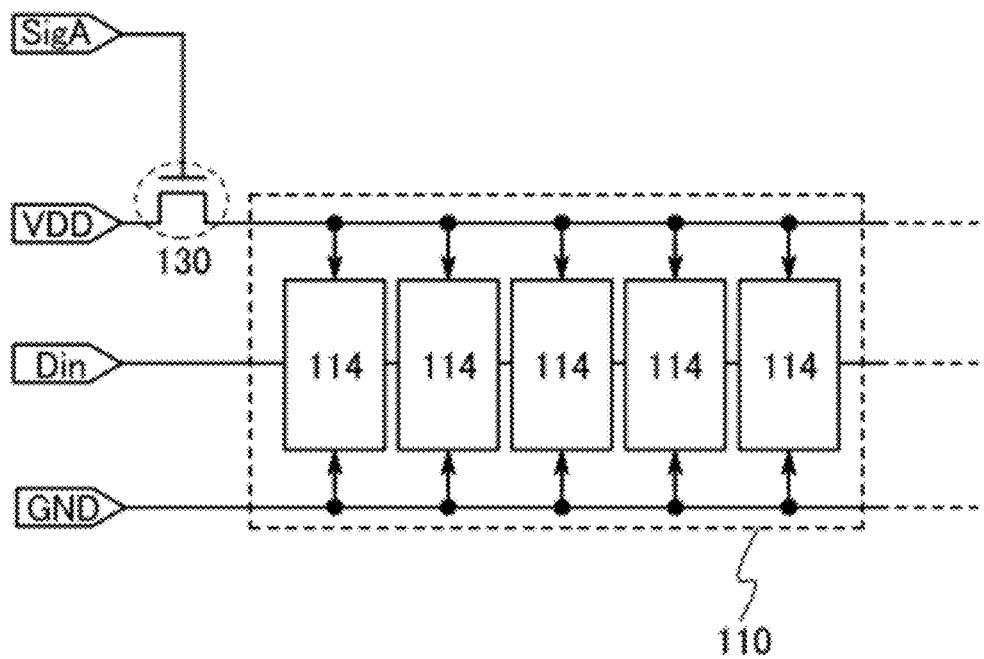
FIGS. 4A and 4B each illustrate a configuration of a memory device.

Note that application of the power supply voltage between the first node and the second node may be controlled by a transistor in which an oxide semiconductor is used in a channel formation region. FIG. 4A illustrates an example of a memory device having such a structure.

The memory device 110 illustrated in FIG. 4A includes and a memory device 110 including a plurality of memory cells 114. Specifically, the memory cell 114 illustrated in FIG. 3 can be used as each of the memory cells 114. A switching element 130 is included in the power supply control circuit 109. Each of the memory cells 114 included in the memory device 110 is supplied with the high-level power supply voltage VDD through the switching element 130. In addition, the voltage of the signal Din and the voltage of the low-level reference voltage GND are applied to each of the memory cells 114 included in the memory device 110.

In FIG. 4A, a transistor including an oxide semiconductor in a channel formation region is used for the switching element 130, and the switching of the transistor is controlled by a signal SigA supplied to a gate electrode thereof. Since the transistor used for the switching element 130 includes the oxide semiconductor in the channel formation region, off-state current is extremely low as described above.

Note that in FIG. 4A, a structure in which the switching element 130 includes one transistor is illustrated; however, the present invention is not limited to this structure. In an embodiment of the present invention, the switching element 130 may include a plurality of transistors. In the case where the plurality of transistors are included in the switching element 130, the plurality of transistors may be connected to each other in parallel, in series, or in combination of parallel connection and series connection.

Figure 4B:
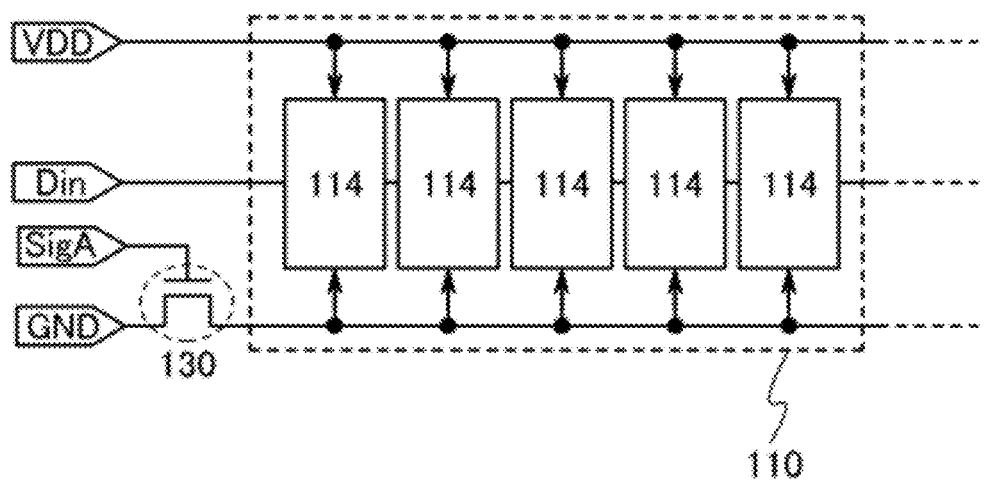

Although the switching element 130 controls supply of the high-level power supply voltage VDD to each of the memory cells 114 included in the memory device 110 in FIG. 4A, the switching element 130 may control supply of the low-level reference voltage GND. In FIG. 4B, an example of the memory device 110 in which each of the memory cells 114 included in the memory device 110 is supplied with the low-level reference voltage GND through the switching element 130 is illustrated. The supply of the low-level reference voltage GND to each of the memory cells 114 included in the memory device 110 can be controlled by the switching element 130.

Figure 5:
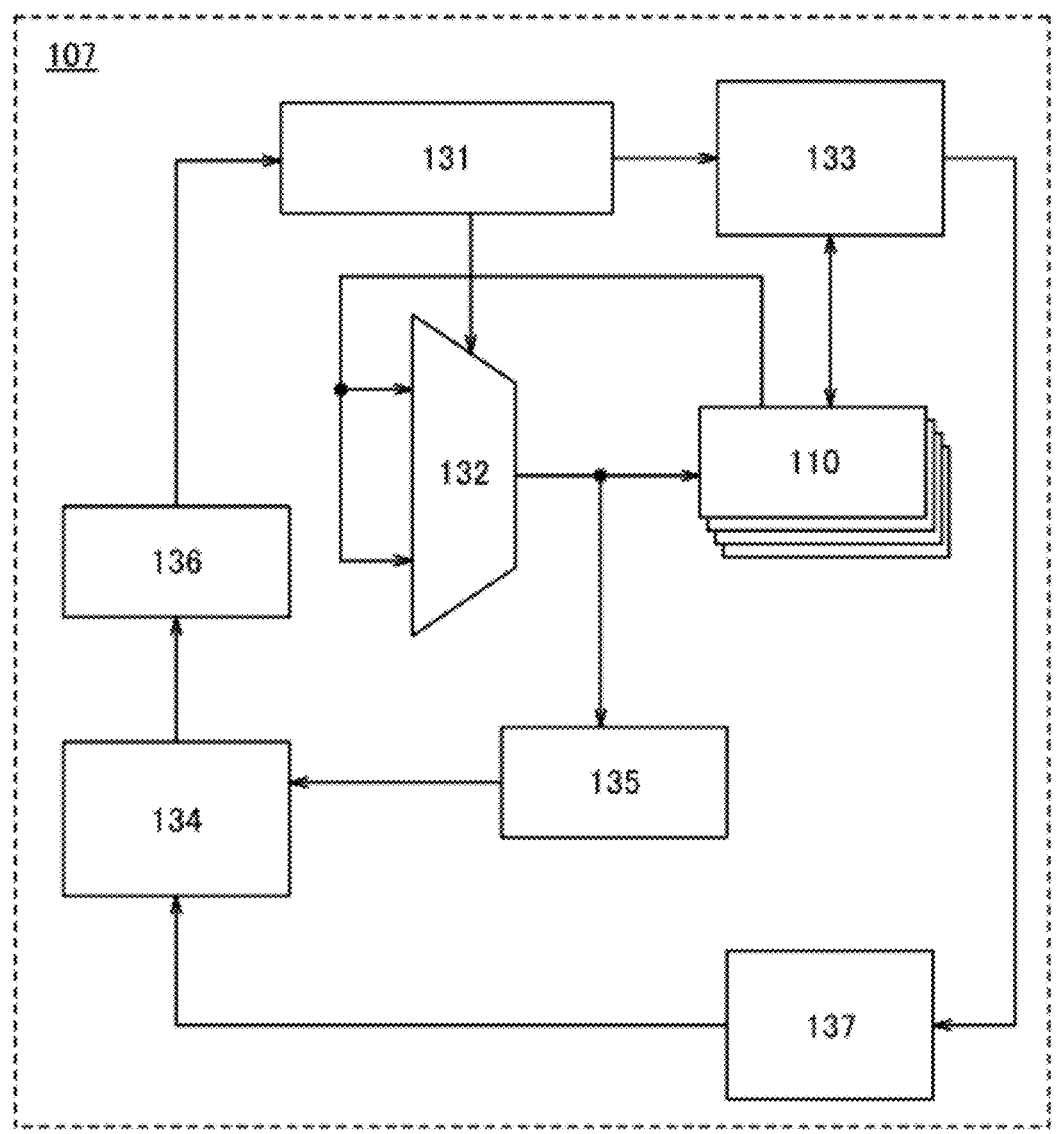
FIG. 5 is a block diagram of a signal processing circuit.

Next, a specific embodiment of a semiconductor device according to the present invention will be described. An example of a structure of the semiconductor device is illustrated as a block diagram in FIG. 5.

A signal processing circuit 107 includes a control unit 131, an arithmetic logic unit (ALU) 132 corresponding to an arithmetic unit, a data cache 133, an instruction cache 134, a program counter 135, an instruction register 136, a non-volatile memory device 137, and a memory device 110.

The control unit 131 has a function of decoding and carrying out an input instruction. The ALU 132 has a function of performing a variety of arithmetic operations such as four arithmetic operations and logic operations. The data cache 133 is a buffer memory device which temporary stores frequently used data. The instruction cache 134 is a buffer memory device which temporary stores frequently used instructions of instructions (programs) sent to the control unit 131. The program counter 135 is a register which stores an address of an instruction to be carried out next. The instruction register 136 is a register which stores an instruction to be carried out next. Data used for the arithmetic operations in the ALU 132 and an instruction which is carried out in the control unit 131 are stored in the non-volatile memory device 137. The memory device 110 can store data which is obtained as a result of the arithmetic operations in the ALU 132, such as data of a corrected digital value Sout' and data of the digital value of L-Flag; data which is read out from the non-volatile memory device 137; data which is obtained during the arithmetic operations in the ALU 132; and the like.

Next, operation of the signal processing circuit 107 will be described.

The control unit 131 reads an instruction from an address of the instruction cache 134 corresponding to the address of the instruction to be carried out next which is stored in the program counter 135, and makes the instruction register 136 store the instruction. When the instruction is not stored in the corresponding address of the instruction cache 134, the control unit 131 gets access to a corresponding address of the non-volatile memory device 137, reads the instruction from the non-volatile memory device 137, and makes the instruction register 136 store the instruction. In this case, the instruction is also stored in the instruction cache 134.

The control unit 131 decodes the instruction stored in the instruction register 136 and carries out the instruction. Specifically, the control unit 131 generates various signals for controlling the operation of the ALU 132 in accordance with the instruction.

When the instruction which is to be carried out is an arithmetic instruction, the control unit 131 makes the ALU 132 perform arithmetic operations using the data stored in the memory device 110, and stores a result of the arithmetic operations in the memory device 110.

When the instruction which is to be carried out is a loading instruction, the control unit 131, first, gets access to a corresponding address of the data cache 133, and checks whether or not a corresponding data exists in the data cache 133. When the corresponding data exists in the data cache 133, the data is copied from the corresponding address of the data cache 133 to the memory device 110. When the corresponding data does not exist in the data cache 133, the data is copied from a corresponding address of the non-volatile memory device 137 to the corresponding address of the data cache 133, and then the data is copied from the corresponding address of the data cache 133 to the memory device 110. Note that in the case where the corresponding data does not exist, since it is necessary to get access to the low-speed non-volatile memory device 137, it takes long time to carry out the instruction as compared to the case where the control unit gets access to only the buffer memory device such as the data cache 133. However, when not only the above data but also the address of the data and data of addresses of the vicinities of the data in the non-volatile memory device 137 are copied to the buffer memory device, second and the subsequent accesses to the address of the data and the addresses of the vicinities thereof in the non-volatile memory device 137 can be performed at high speed.

When the instruction which is to be carried out is a store instruction, the control unit 131 stores data of the memory device 110 in a corresponding address of the data cache 133. In this case, the control unit 131, first, gets access to the corresponding address of the data cache 133 and checks whether or not the corresponding data can be stored in the data cache 133. When the data can be stored in the data cache 133, the data is copied from the memory device 110 to the corresponding address of the data cache 133. When the data cannot be stored, a new corresponding address is assigned in part of the data cache 133, and the data is copied from the memory device 110 to the corresponding address of the data cache 133. Note that the data may be copied to the non-volatile memory device 137 immediately after the data is copied to the data cache 133. Alternatively, some pieces of data may be copied to the data cache 133 and then the pieces of data may be collectively copied to the non-volatile memory device 137.

Then, after the control unit 131 carries out the instruction, the control unit 131 gets access to the program counter 135 again, and repeats the above operation in which an instruction read out from the instruction register 136 is decoded and carried out.

The ALU 132 selects the holding operation in the memory device 110. In other words, the ALU 132 selects whether data is held in the memory element 111 or in the capacitor 112 in the memory device 110. Specifically, when fluctuation of the input voltage of the DC-DC converter is large, or when the output voltage of the DC-DC converter is not kept at a desired value, the holding of data in the memory element 111 is selected. Further, when the output voltage is kept at the desired value and when the fluctuation of the input voltage is small, the holding of data in the capacitor 112 is selected before supply of the power supply voltage to the memory element 111 in the memory device 110 is stopped and rewriting of data in the capacitor 112 is performed. The stop of supply of the power supply voltage can be performed by a switching element between a group of the memory cells 114 and a node to which the power supply voltage VDD or the reference voltage GND is applied, as illustrated in FIG. 4A or FIG. 4B.

Further, in an embodiment of the present invention, a transistor having extremely low off-state current is used as a switching element for holding charge in a capacitor, so that the amount of charge leaking from the capacitor can be suppressed. Therefore, in an embodiment of the present invention, the memory device 110, whereby erasure of data can be prevented even when supply of the power supply voltage is stopped. Accordingly, supply of the power supply voltage can be stopped even for a short time in the whole of the signal processing circuit 107 or in the logic circuit such as the control unit 131 or the ALU 132 included in the signal processing circuit 107. Thus, power consumption of the signal processing circuit 107 can be reduced. Further, in an embodiment of the present invention, a transistor included in a memory element and a transistor included in a switching element are stacked in a memory device, whereby high integration of the signal processing circuit 107 can be achieved.

This embodiment can be implemented by being combined as appropriate with any of the above-described embodiments.

Embodiment 3

In this embodiment, an example of a specific structure of the memory device is illustrated. In this embodiment, an example is illustrated in which the memory element includes a transistor including silicon having crystallinity in a channel formation region, and a transistor including an oxide semiconductor in a channel formation region for controlling supply, holding, and discharge of charge in the capacitor.

Figure 6:
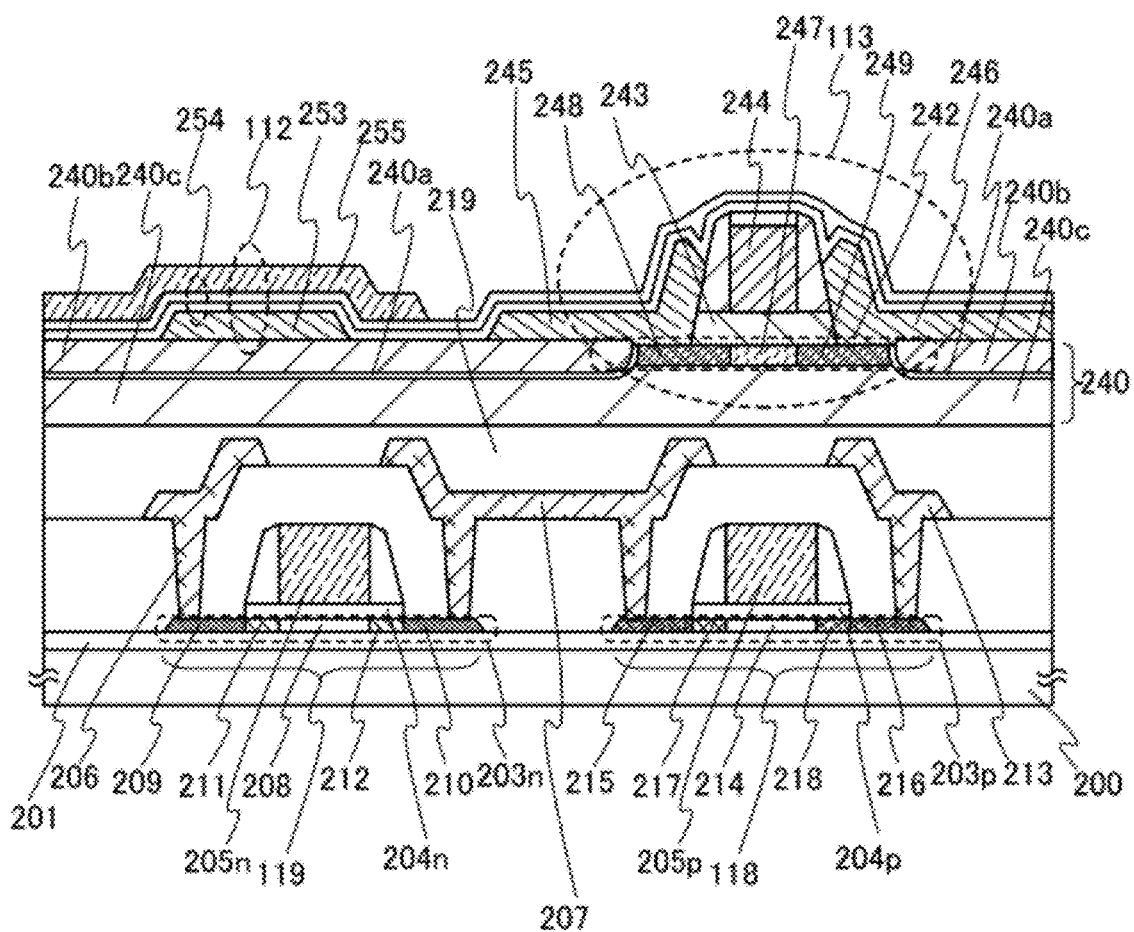
FIG. 6 is a cross-sectional view of a memory device.

FIG. 6 shows a cross-sectional view as an example of structures of a p-channel transistor 118, an n-channel transistor 119, a capacitor 112, and a transistor 113, which are included in the memory element.

The memory device illustrated in FIG. 6 includes the n-channel transistor 119 and the p-channel transistor 118 over a substrate 200. An insulating film 201 is formed over a surface of the substrate 200.

The n-channel transistor 119 includes a semiconductor film 203n including silicon having crystallinity, a gate insulating film 204n over the semiconductor film 203n, a gate electrode 205n provided in a portion overlapping with the semiconductor film 203n with the gate insulating film 204n provided therebetween, and a conductive film 206 and a conductive film 207 which are connected to the semiconductor film 203n. The semiconductor film 203n includes a first region 208 serving as a channel formation region and second regions 209 and 210 serving as a source and a drain. The first region 208 is sandwiched between the second regions 209 and 210. FIG. 6 illustrates an example of the case where the semiconductor film 203n includes third regions 211 and 212 serving as lightly doped drain (LDD) regions between the first region 208 and the second region 209 and between the first region 208 and the second region 210.

The p-channel transistor 118 includes a semiconductor film 203p including silicon having crystallinity, a gate insulating film 204p over the semiconductor film 203p, a gate electrode 205p provided in a portion overlapping with the semiconductor film 203p with the gate insulating film 204p provided therebetween, and the conductive film 207 and a conductive film 213 which are connected to the semiconductor film 203p. The semiconductor film 203p includes a first region 214 serving as a channel formation region and second regions 215 and 216 serving as a source and a drain. The first region 214 is sandwiched between the second regions 215 and 216. FIG. 6 illustrates an example of the case where the semiconductor film 203p includes third regions 217 and 218 serving as LDD regions between the first region 214 and the second region 215 and between the first region 214 and the second region 216.

Note that FIG. 6 illustrates the case where the n-channel transistor 119 and the p-channel transistor 118 share the conductive film 207.

Further, FIG. 6 illustrates the case where the n-channel transistor 119 and the p-channel transistor 118 each include a thin semiconductor film; however, the n-channel transistor 119 and the p-channel transistor 118 may each have a channel formation region in a bulk semiconductor substrate. For the thin semiconductor film, for example, polycrystalline silicon obtained by crystallization of amorphous silicon with the use of a laser, single crystal silicon obtained in such a manner that hydrogen ions or the like are implanted into a single crystal silicon wafer and a surface portion of the single crystal silicon wafer is separated, and the like can be used.

Further, in the memory device illustrated in FIG. 6, an insulating film 219 is formed over the conductive film 206, the conductive film 207, and a conductive film 213. An insulating film 240 including a first oxide insulating film 240a, a second oxide insulating film 240b, and a third oxide insulating film 240c is provided over the insulating film 219. The transistor 113 is provided over the insulating film 240.

The first oxide insulating film 240a and the third oxide insulating film 240c are formed using an oxide insulating film from which part of oxygen is released by heating. As such an oxide insulating film from which part of oxygen is released by heating, an insulating film which contains oxygen at a proportion exceeding the stoichiometric proportion is preferably used. Silicon oxide, silicon oxynitride, silicon nitride oxide, gallium oxide, hafnium oxide, yttrium oxide, or the like can be used for the first oxide insulating film 240a and the third oxide insulating film 240c.

The second oxide insulating film 240b is formed using an oxide insulating film which prevents diffusion of oxygen. The second oxide insulating film 240b is formed using aluminum oxide, aluminum oxynitride, or the like, for example. As for aluminum oxide, aluminum oxide containing oxygen at a proportion satisfying the stoichiometric proportion or aluminum oxide containing oxygen at a proportion exceeding the stoichiometric proportion (AlOx, x is greater than or equal to 3/2) is preferably used. In addition, in aluminum oxynitride, part of oxygen in aluminum oxide containing oxygen at a proportion satisfying the stoichiometric proportion is replaced with nitrogen.

Note that "to release oxygen by heating" means that the amount of released oxygen is greater than or equal to $1.0 \times 10^{18}$ atoms/cm$^3$, preferably greater than or equal to $3.0 \times 10^{20}$ atoms/cm$^3$ in thermal desorption spectroscopy (TDS) on an oxygen atom basis.

Here, a measurement method of the amount of released oxygen converted into oxygen atoms in TDS analysis is described as below.

The desorption amount of gas in the TDS analysis is proportional to an integral value of spectrum. Therefore, the amount of released gas can be calculated from the ratio of the integral value of a spectrum of an insulating film to the reference value of a standard sample. The reference value of a standard sample refers to the ratio of the density of a predetermined atom contained in a sample to the integral value of a spectrum.

For example, the number of released oxygen molecules ($N_{O2}$) from an insulating film can be found according to Formula 1 with the TDS analysis results of a silicon wafer containing hydrogen at a predetermined density which is the standard sample and the TDS analysis results of the insulating film. CH$_3$OH, which is given as a gas having a mass number of 32, is unlikely to be present in the insulating film. Therefore, all spectra having a mass number of 32 which are obtained by the TDS analysis are assumed to originate from an oxygen molecule. Further, an oxygen molecule including an oxygen atom having a mass number of 17 or 18 which is an isotope of oxygen is assumed not to be present because the proportion of such a molecule in the natural world is minimal.

$$N_{O2} = N_{H2}/S_{H2} \times S_{O2} \times \alpha \qquad \text{[Formula 1]}$$

$N_{H2}$ is the value obtained by conversion of the number of hydrogen molecules released from the standard sample into densities. $S_{H2}$ is the integral value of a spectrum when the standard sample is subjected to TDS analysis. Here, the reference value of the standard sample is set to $N_{H2}/S_{H2}$. $S_{O2}$ is the integral value of a spectrum when the insulating film is subjected to TDS analysis. α is a coefficient affecting the intensity of the spectrum in the TDS analysis. Refer to Japanese Published Patent Application No. H6-275697 for details of the Formula 1. Note that the amount of released oxygen from the above insulating film is measured with a thermal desorption spectroscopy apparatus produced by ESCO Ltd., EMD-WA1000S/W using a silicon wafer containing hydrogen atoms at $1 \times 10^{16}$ atoms/cm$^3$ as the standard sample.

Further, in the TDS analysis, some amount of oxygen is detected as an oxygen atom. The ratio between oxygen molecules and oxygen atoms can be calculated from the ionization rate of the oxygen molecules. Note that, since the above a includes the ionization rate of oxygen molecules, the number of the released oxygen atoms can also be estimated through the evaluation of the number of the released oxygen molecules.

Note that $N_{O2}$ is the number of released oxygen molecules. The amount of released oxygen on an oxygen atom basis is twice the number of the released oxygen molecules.

In the above structure, the insulating film from which oxygen is released by heating may be oxygen-excess silicon oxide ($SiO_X$ (X>2)). In the oxygen-excess silicon oxide ($SiO_X$ (X>2)), the number of oxygen atoms per unit volume is more than twice the number of silicon atoms per unit volume. The number of silicon atoms and the number of oxygen atoms per unit volume are measured by Rutherford backscattering spectrometry.

Specifically, the transistor 113 includes an oxide semiconductor film 242, a gate insulating film 243 over the oxide semiconductor film 242, a gate electrode 244 overlapping with the oxide semiconductor film 242 with the gate insulating film 243 provided therebetween, a conductive film 245 and a conductive film 246 which are connected to the oxide semiconductor film 242. The oxide semiconductor film 242 includes a first region 247 which overlaps with the gate electrode 244 and at least part of which serves as a channel formation region, and the second regions 248 and 249 which serve as a source and a drain and between which the first region 247 is sandwiched.

As one example of a semiconductor material which has a wider band gap than a silicon semiconductor and has a lower intrinsic carrier density than silicon, a compound semiconductor such as silicon carbide (SiC) or gallium nitride (GaN) can be given in addition to an oxide semiconductor. The oxide semiconductor has an advantage of high mass productivity because the oxide semiconductor can be formed by a sputtering method or a wet process, unlike silicon carbide or gallium nitride. Further, unlike silicon carbide or gallium nitride, the oxide semiconductor can be deposited even at room temperature; thus, deposition over a glass substrate or deposition over an integrated circuit using silicon is possible. Further, a larger substrate can be used. Accordingly, among the semiconductors with wide band gaps, the oxide semiconductor particularly has an advantage of high mass productivity. Further, in the case where an oxide semiconductor with high crystallinity is to be obtained in order to improve the property of a transistor (e.g., field-effect mobility), the oxide semiconductor with crystallinity can be easily obtained by heat treatment at 250° C. to 800° C.

Next, a specific cross-sectional structure of the transistor 113 illustrated in FIG. 6 will be described with reference to FIGS. 7A to 7C.

Figure 7A:
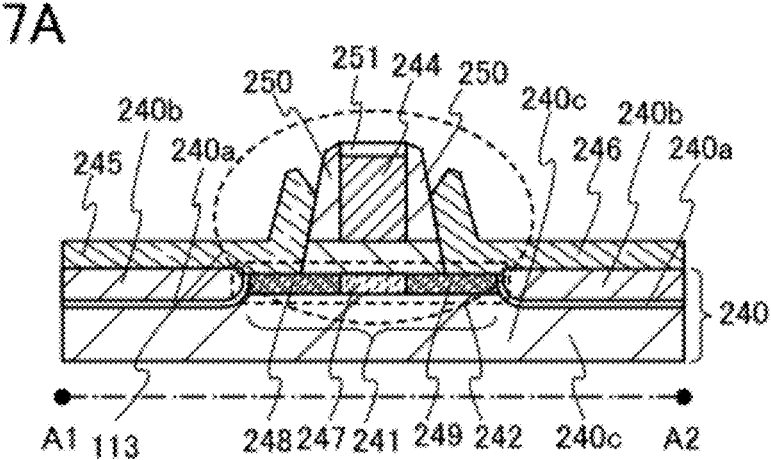
FIGS. 7A and 7C are cross-sectional views of a transistor and FIG. 7B is a top view of the transistor.
Figure 7B:
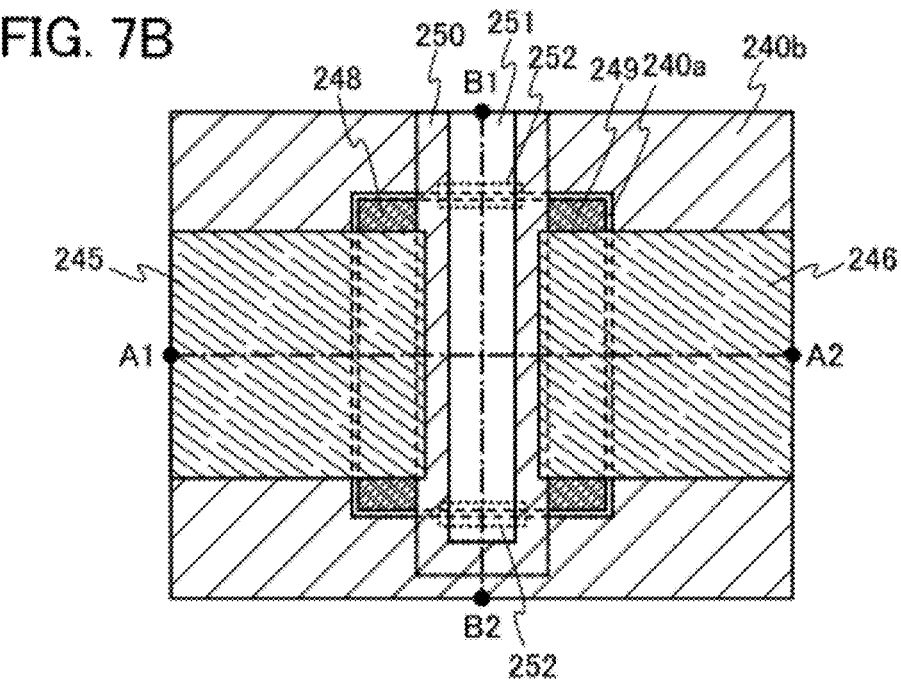
Figure 7C:
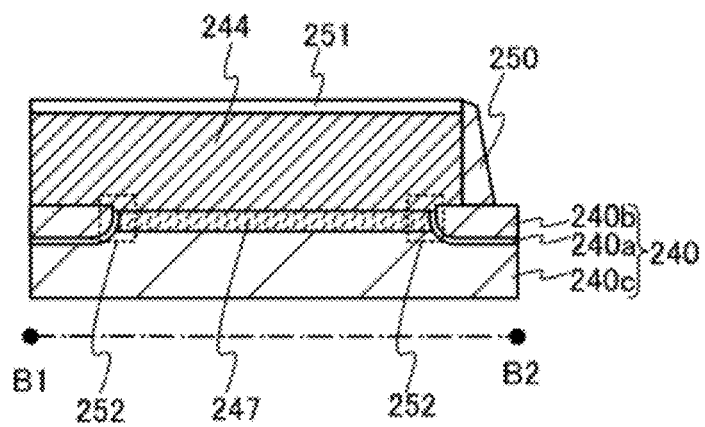

FIG. 7A is a cross-sectional view of the insulating film 240 and the transistor 113 and FIG. 7B is a top view of the insulating film 240 and the transistor 113. FIG. 7A is the cross-sectional view taken along dashed-dotted line A1-A2 in FIG. 7B. FIG. 7C is a cross-sectional view of the insulating film 240 and the transistor 113, taken along dashed-dotted line B1-B2 in FIG. 7B.

In the transistor 113, sidewalls 250 including an insulating film is provided on side portions of the gate electrode 244, and an insulating film 251 is provided over the gate electrode 244. Further, part of the conductive film 245 and part of the conductive film 246 are in contact with the sidewalls 250. The conductive film 245 and the conductive film 246 are not necessarily in contact with the sidewalls 250. However, when the conductive film 245 and the conductive film 246 are formed in contact with the sidewalls 250, the size of the area where the oxide semiconductor film 242 is in contact with the conductive film 245 and the conductive film 246 can be prevented from changing even in the case where the conductive film 245 and the conductive film 246 deviate from appropriate positions. Accordingly, variation in on-state current of the transistor 113 due to deviation of positions of the conductive film 245 and the conductive film 246 can be prevented.

Note that the insulating film 251 over the gate electrode 244 is not necessarily provided. However, when the insulating film 251 is provided, electrical conduction between the conductive film 245 and the gate electrode 244 and between the conductive film 246 and the gate electrode 244 can be prevented even in the case where the conductive film 245 or the conductive film 246 is formed on the gate electrode 244.

In the insulating film 240, the first oxide insulating film 240a and the second oxide insulating film 240b are stacked in this order over the third oxide insulating film 240c positioned in the lowermost layer. The opening portion 241 is formed in the first oxide insulating film 240a and the second oxide insulating film 240b, and the oxide semiconductor film 242 of the transistor 113 is provided in the opening portion 241. The first oxide insulating film 240a is provided in the periphery of the oxide semiconductor film 242 so as to be in contact with an end portion of the oxide semiconductor film 242. The second oxide insulating film 240b is provided in the periphery of the oxide semiconductor film 242 with the first oxide insulating film 240a provided therebetween. The third oxide insulating film 240c is provided below the oxide semiconductor film 242.

In the above structure, oxygen released from the first oxide insulating film 240a by heating can be prevented from passing through the second oxide insulating film 240b; thus, the oxygen is effectively supplied to end portions 252 of the oxide semiconductor film 242 in the first region 247. In addition, oxygen released from the third oxide insulating film 240c is supplied to the lower portion of the oxide semiconductor film 242. Note that oxygen deficiency due to release of oxygen is easily caused at an end portion of the oxide semiconductor film 242 in the transistor 113 in which the oxide semiconductor is used in a channel formation region because of etching treatment for etching the oxide semiconductor film 242 into a desired shape, exposure of the end portion of the oxide semiconductor film 242 to a reduced-pressure atmosphere, or the like. Since oxygen deficiency becomes a path through which carriers move, a parasitic channel is formed when oxygen deficiency is formed at the end portion of the oxide semiconductor film 242 and thus the off-state current of the transistor 113 is increased. However, in an embodiment of the present invention, with the above structure, oxygen deficiency is prevented from being formed at the end portions 252 of the oxide semiconductor film 242 in the first region 247 and thus the off-state current can be reduced.

Further, as illustrated in FIG. 6, the capacitor 112 includes a conductive film 253 over the insulating film 240, an insulating film 254 over the conductive film 253, and a conductive film 255 which is provided in a position overlapping with the conductive film 253 with the insulating film 254 provided therebetween. The insulating film 254 is also provided over the transistor 113. The conductive film 253 and the conductive film 245 may be electrically connected to each other, or the conductive film 253 and the conductive film 245 may be one conductive film.

Note that FIG. 6 illustrates the case where the capacitor 112, as well as the transistor 113, is formed over the insulating film 240; however, the capacitor 112, as well as the n-channel transistor 119 and the p-channel transistor 118, may be formed below the insulating film 240.

FIG. 6 illustrates the case where the insulating film 219 is provided between the insulating film 240 and the n-channel transistor 119 and between the insulating film 240 and the p-channel transistor 118. However, the insulating film 219 is not necessarily provided. In the case where the insulating film 219 is not provided, the insulating film 240 is provided in contact with the conductive film 206, the conductive film 207, and the conductive film 213.

Further, in FIG. 6, the transistor 113 includes at least the gate electrode 244 on one side of the oxide semiconductor film 242, but may include a pair of gate electrodes with the oxide semiconductor film 242 provided therebetween.

Figure 8A:
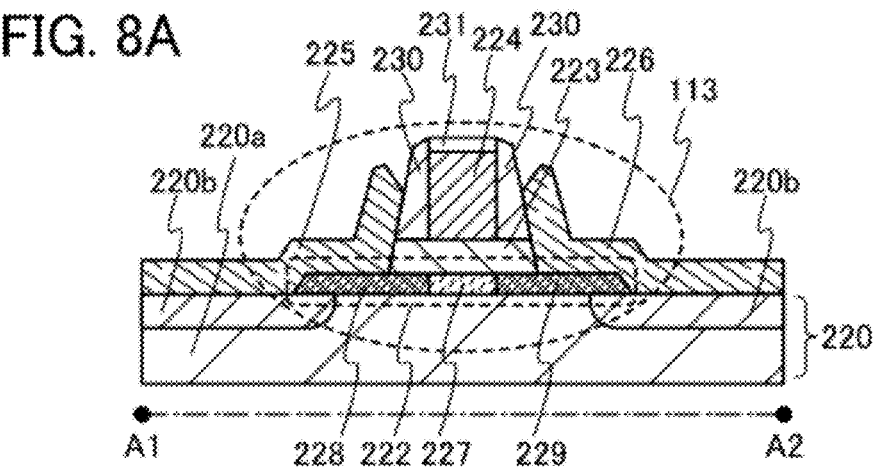
FIGS. 8A and 8C are cross-sectional views of a transistor and FIG. 8B is a top view of the transistor.
Figure 8B:
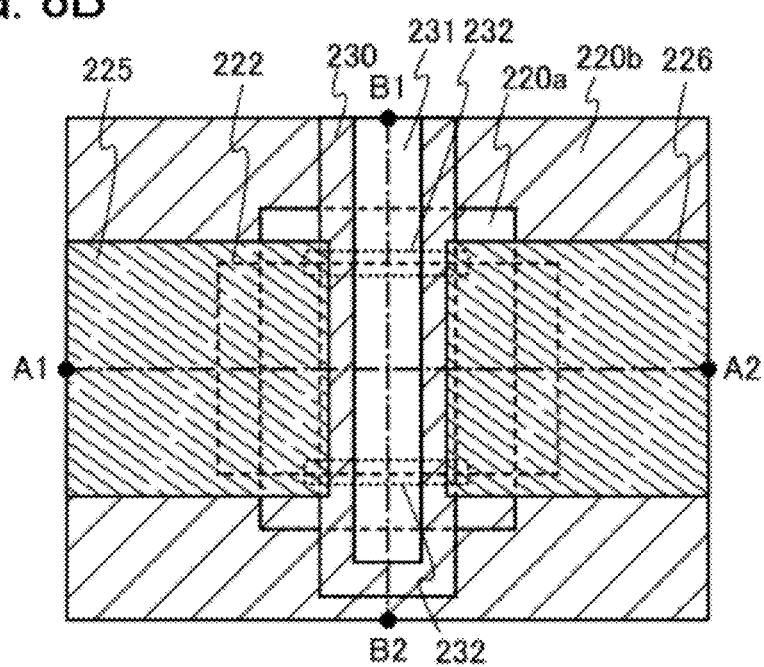
Figure 8C:
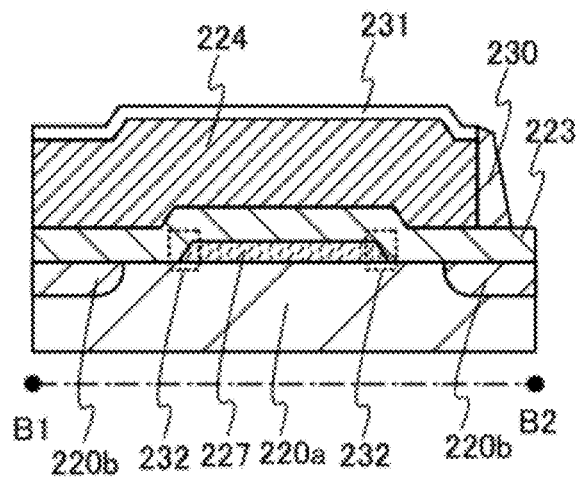

The configuration of a memory device according to an embodiment of the present invention in which the structure of the transistor 113 is different from that of the memory device illustrated in FIG. 6 is described. FIGS. 8A to 8C illustrate an example of the structure of the transistor 113. In FIGS. 8A to 8C, the transistor 113 is provided over an insulating film 220 including a first insulating film 220a and a second insulating film 220b. FIG. 8A is a cross-sectional view of the insulating film 220 and the transistor 113 and FIG. 8B is a top view of the insulating film 220 and the transistor 113. A cross-sectional view taken along dashed line A1-A2 in FIG. 8B corresponds to FIG. 8A. FIG. 8C is a cross-sectional view of the insulating film 220 and the transistor 113, taken along dashed-dotted line B1-B2 in FIG. 8B.

The first oxide insulating film 220a are each formed using an oxide insulating film from which part of oxygen is released by heating. As such an oxide insulating film from which part of oxygen is released by heating, an insulating film which contains oxygen at a proportion exceeding the stoichiometric proportion is preferably used. Silicon oxide, silicon oxynitride, silicon nitride oxide, gallium oxide, hafnium oxide, yttrium oxide, or the like can be used for the first oxide insulating film 220a.

The second oxide insulating film 220b is formed using an oxide insulating film which prevents diffusion of oxygen. The second oxide insulating film 220b is formed using aluminum oxide, aluminum oxynitride, or the like, for example. As for aluminum oxide, aluminum oxide containing oxygen at a proportion satisfying the stoichiometric proportion or aluminum oxide containing oxygen at a proportion exceeding the stoichiometric proportion (AlOx, x is greater than or equal to 3/2) is preferably used. In addition, in aluminum oxynitride, part of oxygen in aluminum oxide containing oxygen at a proportion satisfying the stoichiometric proportion is replaced with nitrogen.

The transistor 113 includes an oxide semiconductor film 222 provided over the insulating film 220, a gate insulating film 223 over the oxide semiconductor film 222, a gate electrode 224 which is provided in a portion overlapping with the oxide semiconductor film 222 with the gate insulating film 223 provided therebetween, and the conductive film 225 and the conductive film 226 which are connected to the oxide semiconductor film 222. The oxide semiconductor film 222 includes a first region 227 which overlaps with the gate electrode 224 and at least part of which serves as a channel formation region, and second regions 228 and 229 which serve as a source and a drain and between which the first region 227 is sandwiched.

In the transistor 113, sidewalls 230 including an insulating film is provided on side portions of the gate electrode 224, and an insulating film 231 is provided over the gate electrode 224. Further, part of the conductive film 225 and part of the conductive film 226 are in contact with the sidewalls 230. The conductive film 225 and the conductive film 226 are not necessarily in contact with the sidewalls 230. However, when the conductive film 225 and the conductive film 226 are formed in contact with the sidewalls 230, the size of the area where the oxide semiconductor film 222 is in contact with the conductive film 225 and the conductive film 226 can be prevented from changing even in the case where the conductive film 225 and the conductive film 226 deviate from appropriate positions. Accordingly, variation in on-state current of the transistor 113 due to deviation of positions of the conductive film 225 and the conductive film 226 can be prevented.

Note that the insulating film 231 over the gate electrode 224 is not necessarily provided. However, when the insulating film 231 is provided, electrical conduction between the conductive film 225 and the gate electrode 224 and between the conductive film 226 and the gate electrode 224 can be prevented even in the case where the conductive film 225 or the conductive film 226 is formed on the gate electrode 224.

Further, in the insulating film 220, the second oxide insulating film 220b is provided in the periphery of the first oxide insulating film 220a. The first region 227 of the oxide semiconductor film 222 is in contact with the first oxide insulating film 220a and the second regions 228 and 229 of the oxide semiconductor film 222 are in contact with the first oxide insulating film 220a and the second oxide insulating film 220b.

In the above structure, oxygen released from the first oxide insulating film 220a by heating can be prevented from passing through the second oxide insulating film 220b; thus, the oxygen is effectively supplied to end portions 232 of the oxide semiconductor film 222 in the first region 227. Note that oxygen deficiency due to release of oxygen is easily caused at an end portion of the oxide semiconductor film 222 in the transistor 113 in which the oxide semiconductor is used in a channel formation region because of etching treatment for etching the oxide semiconductor film 222 into a desired shape, exposure of the end portion of the oxide semiconductor film 222 to a reduced-pressure atmosphere, or the like. Since oxygen deficiency becomes a path through which carriers move, a parasitic channel is formed when oxygen deficiency is formed at the end portion of the oxide semiconductor film 222 and thus the off-state current of the transistor 113 is increased. However, in an embodiment of the present invention, with the above structure, oxygen deficiency is prevented from being formed at the end portions 232 of the oxide semiconductor film 222 in the first region 227 and thus the off-state current can be reduced.

Further, in FIGS. 8A to 8C the transistor 113 includes the gate electrode 224 on at least one side of the oxide semiconductor film 222. Alternatively, a pair of gate electrodes may be provided with the oxide semiconductor film 222 provided therebetween.

Note that a purified oxide semiconductor (purified OS) obtained by reduction of impurities such as moisture or hydrogen which serves as an electron donor (donor) and by reduction of oxygen defects is an intrinsic (i-type) semiconductor or a substantially i-type semiconductor. Therefore, a transistor including the oxide semiconductor has a characteristic of very small off current. Furthermore, the band gap of the oxide semiconductor is 2 eV or more, preferably 2.5 eV or more, more preferably 3 eV or more. With the use of an oxide semiconductor film which is highly purified by a sufficient decrease in the concentration of impurities such as moisture and hydrogen and a reduction of oxygen vacancies, the off-state current of a transistor can be decreased.

Specifically, various experiments can prove low off-state current of a transistor including a highly-purified oxide semiconductor film as a channel formation region. For example, even when an element has a channel width of $1\times10^6$ μm and a channel length of 10 μm, off-state current can be lower than or equal to the measurement limit of a semiconductor parameter analyzer, i.e., lower than or equal to $1\times10^{-13}$ A, at voltage (drain voltage) between the source electrode and the drain electrode of from 1 V to 10 V. In this case, it can be seen that the off-state current corresponding to a value obtained by dividing the off-state current by the channel width of the transistor is 100 zA/μm or lower. In addition, a capacitor and a transistor are connected to each other and the off-state current is measured with a circuit in which charge flowing into or from the capacitor is controlled by the transistor. In the measurement, a purified oxide semiconductor film has been used for a channel formation region of the transistor, and the off-state current of the transistor has been measured from a change in the amount of charge of the capacitor per unit time. As a result, it is found that in the case where the voltage between the source electrode and the drain electrode of the transistor is 3 V, lower off-state current of several tens of yoctoamperes per micrometer (yA/μm) can be obtained. Accordingly, the off-state current of the transistor in which the purified oxide semiconductor film is used as a channel formation region is considerably lower than that of a transistor in which silicon having crystallinity is used.

Note that as the oxide semiconductor, preferably oxide containing In or Zn, more preferably oxide containing In and Ga or oxide containing In and Zn is used. In order to obtain an i-type (intrinsic) oxide semiconductor film, dehydration or dehydrogenation to be described later is effective. As a stabilizer for reducing change in electric characteristics of a transistor including the oxide semiconductor, gallium (Ga) is preferably additionally contained. Tin (Sn) is preferably contained as a stabilizer. Hafnium (Hf) is preferably contained as a stabilizer. Aluminum (Al) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, an indium oxide, a tin oxide, a zinc oxide, a two-component metal oxide such as an In—Zn—based oxide, a Sn—Zn-based oxide, an Al—Zn-based oxide, a Zn—Mg-based oxide, a Sn—Mg-based oxide, an In—Mg-based oxide, or an In—Ga-based oxide, a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used. The above oxide semiconductor may include silicon.

In this specification, an In—Ga—Zn-based oxide means, for example, an oxide including In, Ga, and Zn, and there is no limitation on the ratio of In:Ga:Zn. Further, the In—Ga—Zn-based oxide may contain a metal element other than In, Ga, and Zn. Note that an In—Ga—Zn-based oxide has sufficiently high resistance when there is no electric field and thus off-state current can be sufficiently reduced. In addition, also having high field-effect mobility, the In—Ga—Zn-based oxide is suitable for a semiconductor material used for a solid-state image sensing device or a semiconductor display device.

Alternatively, a material represented by $InMO_3(ZnO)_m$ (m>0) may be used as an oxide semiconductor. Note that M represents one or more metal elements selected from Ga, Al, Mn, and Co. For example, M may be Ga, Ga and Al, Ga and Fe, Ga and Ni, Ga and Mn, Ga and Co, or the like. Alternatively, as the oxide semiconductor, a material expressed by a chemical formula, $In_3SnO_5(ZnO)_n$ (n>0, n is an integer) may be used. Note that the above-described compositions are derived from the crystal structures that the oxide semiconductor material can have and are only examples.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or any of oxides whose composition is in the neighborhood of the above compositions can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or any of oxides whose composition is in the neighborhood of the above compositions may be used.

However, without limitation to the materials given above, a material with an appropriate composition may be used depending on needed semiconductor characteristics (e.g., mobility, threshold voltage, and variation). In order to obtain the needed semiconductor characteristics, it is preferable that the carrier density, the impurity concentration, the defect density, the atomic ratio between a metal element and oxygen, the interatomic distance, the density, and the like be set to appropriate values.

Note that for example, the expression "the composition of an oxide including In, Ga, and Zn at the atomic ratio, In:Ga:Zn=a:b:c (a+b+c=1), is in the neighborhood of the composition of an oxide including In, Ga, and Zn at the atomic ratio, In:Ga:Zn=A:B:C (A+B+C=1)" means that a, b, and c satisfy the following relation: $(a-A)^2+(b-B)^2+(c-C)^2 \le r^2$, and r may be 0.05, for example. The same applies to other oxides.

Further, the oxide semiconductor may be either amorphous or crystalline. In the latter case, the oxide semiconductor layer may be either single crystalline or polycrystalline, may have a structure in which part of the oxide semiconductor layer is crystalline, may have an amorphous structure including a crystalline portion, or may have a non-amorphous structure. As an example of such a partly crystalline structure, an oxide including a crystal with c-axis alignment (also referred to as a c-axis-aligned crystal (CAAC)), which has a triangular or hexagonal atomic arrangement when seen from the direction of an a-b plane, a surface, or an interface, may be used. In the crystal, metal atoms are arranged in a layered manner, or metal atoms and oxygen atoms are arranged in a layered manner along the c-axis, when seen from the direction perpendicular to the c-axis, and the direction of the a-axis or the b-axis is varied in the a-b plane (the crystal rotates around the c-axis).

In an oxide semiconductor in an amorphous state, a flat surface can be obtained with relative ease, so that when a transistor is manufactured with the use of the oxide semiconductor, interface scattering can be reduced, and relatively high mobility can be obtained with relative ease.

In an oxide semiconductor having crystallinity, defects in the bulk can be further reduced as compared to in an oxide semiconductor in an amorphous state and when a surface flatness is improved, mobility higher than that of the oxide semiconductor in an amorphous state can be obtained. In order to improve the surface flatness, the oxide semiconductor is preferably formed over a flat surface. Specifically, the oxide semiconductor may be formed over a surface with the average surface roughness (Ra) of less than or equal to 1 nm, preferably less than or equal to 0.3 nm, more preferably less than or equal to 0.1 nm.

Note that $R_a$ is obtained by expanding, into three dimensions, center line average roughness that is defined by JIS B 0601 so as to be applied to a surface. Moreover, $R_a$ can be expressed as an "average value of the absolute values of deviations from a reference surface to a designated surface" and is defined by Formula 2.

$$Ra = \frac{1}{S_0} \int_{y_1}^{y_2} \int_{x_1}^{x_2} |f(x, y) - Z_0| dx dy \quad \text{[FORMULA 2]}$$

In Formula 2, $S_0$ represents the area of a plane to be measured (a rectangular region which is defined by four points represented by coordinates $(x_1, y_1)$, $(x_1, y_2)$, $(x_2, y_1)$, and $(x_2, y_2)$), and $Z_0$ represents the average height of the plane to be measured. $R_a$ can be measured using an atomic force microscope (AFM).

For example, the oxide semiconductor film can be formed by a sputtering method using a target including indium (In), gallium (Ga), and zinc (Zn). In the case of forming an In—Ga—Zn-based oxide semiconductor film by a sputtering method, it is preferable to use a target of an In—Ga—Zn-based oxide having an atomic ratio of In:Ga:Zn=1:1:1, 4:2:3, 3:1:2, 1:1:2, 2:1:3, or 3:1:4. When an oxide semiconductor film is formed using a target of an In—Ga—Zn-based oxide having the aforementioned atomic ratio, a polycrystal or a c-axis-aligned crystal (CAAC) is likely to be formed. The filling factor of the target including In, Ga, and Zn is 90% or higher and 100% or lower, and preferably 95% or higher and lower than 100%. With the use of the target with high filling rate, a dense oxide semiconductor film is formed.

In the case where an In—Zn-based oxide material is used as an oxide semiconductor, a target of the In—Zn-based oxide has a composition ratio of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), further preferably In:Zn=1.5:1 to 15:1 in an atomic ratio ($In_2O_3$:ZnO=3:4 to 15:2 in a molar ratio). For example, in a target used for formation of an oxide semiconductor film including an In—Zn-based oxide which has an atomic ratio of In:Zn:O=X:Y:Z, the relation of Z>1.5X+Y is satisfied. The mobility can be improved by keeping the ratio of Zn within the above range.

Specifically, the oxide semiconductor film may be formed as follows: the substrate is held in the chamber with pressure reduced, residual moisture in the chamber is removed, a sputtering gas from which hydrogen and moisture are removed is introduced, and the above-described target is used. The substrate temperature may be 100° C. to 600° C. inclusive, preferably 200° C. to 400° C. inclusive in film formation. By forming the oxide semiconductor film in a state where the substrate is heated, the concentration of impurities included in the formed oxide semiconductor film can be reduced. In addition, damage by sputtering can be reduced. In order to remove remaining moisture in the treatment chamber, an entrapment vacuum pump is preferably used. For example, a cryopump, an ion pump, or a titanium sublimation pump is preferably used. The evacuation unit may be a turbo pump provided with a cold trap. In the deposition chamber which is evacuated with the cryopump, for example, a hydrogen atom, a compound containing a hydrogen atom, such as water ($H_2O$), (more preferably, also a compound containing a carbon atom), and the like are removed, whereby the impurity concentration in the oxide semiconductor film formed in the treatment chamber can be reduced.

Note that the oxide semiconductor film formed by sputtering or the like contains a large amount of moisture or hydrogen (including a hydroxyl group) as an impurity in some cases. Moisture and hydrogen easily form a donor level and thus serve as impurities in the oxide semiconductor. Thus, in one mode of the present invention, in order to reduce impurities such as moisture or hydrogen in the oxide semiconductor film (in order to perform dehydration or dehydrogenation), the oxide semiconductor film is subjected to heat treatment in a reduced-pressure atmosphere, an inert gas atmosphere of nitrogen, a rare gas, or the like, an oxygen gas atmosphere, or ultra dry air (the moisture amount is 20 ppm (−55° C. by conversion into a dew point) or less, preferably 1 ppm or less, more preferably 10 ppb or less, in the case where measurement is performed by a dew point meter in a cavity ring down laser spectroscopy (CRDS) method).

By performing heat treatment on the oxide semiconductor film, moisture or hydrogen in the oxide semiconductor film can be eliminated. Specifically, heat treatment may be performed at a temperature higher than or equal to 250° C. and lower than or equal to 750° C., preferably higher than or equal to 400° C. and lower than the strain point of a substrate. For example, heat treatment may be performed at 500° C. for approximately three minutes to six minutes, inclusive. When an RTA method is used for the heat treatment, dehydration or dehydrogenation can be performed for a short time; therefore, treatment can be performed even at a temperature higher than the strain point of a glass substrate.

Note that in some cases, the heat treatment makes oxygen released from the oxide semiconductor film and oxygen deficiency is formed in the oxide semiconductor film. To prevent the oxygen deficiency, an insulating film including oxygen is used for an insulating film in contact with the oxide semiconductor film, such as a gate insulating film, in an embodiment of the present invention. Then, a heat treatment is performed after formation of the insulating film including oxygen, so that oxygen is supplied from the insulating film to the oxide semiconductor film. With the above structure, oxygen defects that serve as donors can be reduced in the oxide semiconductor film and the stoichiometric composition can be satisfied. It is preferable that the proportion of oxygen in the oxide semiconductor film be higher than that in the stoichiometric composition. As a result, the oxide semiconductor film can be made substantially i-type and variation in electrical characteristics of the transistor due to oxygen vacancies can be reduced, which results in improvement of electrical characteristics.

The heat treatment for supplying oxygen to the semiconductor film is performed in a nitrogen atmosphere, ultra-dry air, or a rare gas (e.g., argon or helium) atmosphere preferably at a temperature higher than or equal to 200° C. and lower than or equal to 400° C., for example, higher than or equal to 250° C. and lower than or equal to 350° C. It is preferable that the water content in the gas be 20 ppm or less, preferably 1 ppm or less, further preferably 10 ppb or less.

In addition, an oxide including a crystal with c-axis alignment (also referred to as a c-axis aligned crystal (CAAC)), which has a triangular or hexagonal atomic arrangement when seen from the direction of an a-b plane, a surface, or an interface, will be described. In the crystal, metal atoms are arranged in a layered manner, or metal atoms and oxygen atoms are arranged in a layered manner when seen from the direction perpendicular to the c-axis, and the direction of the a-axis or the b-axis is varied in the a-b plane (the crystal rotates around the c-axis).

In a broad sense, CAAC means a non-single crystal including a phase which has a triangular, hexagonal, regular triangular, or regular hexagonal atomic arrangement when seen from the direction perpendicular to the a-b plane and in which metal atoms are arranged in a layered manner or metal atoms and oxygen atoms are arranged in a layered manner when seen from the direction perpendicular to the c-axis direction.

The CAAC is not a single crystal, but this does not mean that the CAAC is composed of only an amorphous component. Although the CAAC includes a crystallized portion (crystalline portion), a boundary between one crystalline portion and another crystalline portion is not clear in some cases.

In the case where oxygen is included in the CAAC, nitrogen may be substituted for part of oxygen included in the CAAC. The c-axes of individual crystalline portions included in the CAAC may be aligned in one direction (e.g., a direction perpendicular to a surface of a substrate over which the CAAC is formed or a surface of the CAAC). Alternatively, the normals to the a-b planes of the individual crystalline portions included in the CAAC may be aligned in one direction (e.g., a direction perpendicular to a surface of a substrate provided with the CAAC or a top surface of the CAAC).

The CAAC becomes a conductor, a semiconductor, or an insulator depending on its composition or the like. The CAAC transmits or does not transmit visible light depending on its composition or the like.

An example of such a CAAC is a crystal which is formed into a film shape and has a triangular or hexagonal atomic arrangement when observed from the direction perpendicular to a surface of the film or a surface of a substrate over which the CAAC is formed, and in which metal atoms are arranged in a layered manner or metal atoms and oxygen atoms (or nitrogen atoms) are arranged in a layered manner when a cross section of the film is observed.

An example of a crystal structure of the CAAC will be described in detail with reference to FIGS. 9A to 9E, FIGS. 10A to 10C, and FIGS. 11A to 11C. In FIGS. 9A to 9E, FIGS. 10A to 10C, and FIGS. 11A to 11C, the vertical direction corresponds to the c-axis direction and a plane perpendicular to the c-axis direction corresponds to the a-b plane, unless otherwise specified. When the expressions "an upper half" and "a lower half" are simply used, they refer to an upper half above the a-b plane and a lower half below the a-b plane (an upper half and a lower half with respect to the a-b plane). Furthermore, in FIGS. 9A to 9E, O surrounded by a circle represents tetracoordinate O and a double circle represents tricoordinate O.

Figure 9A:
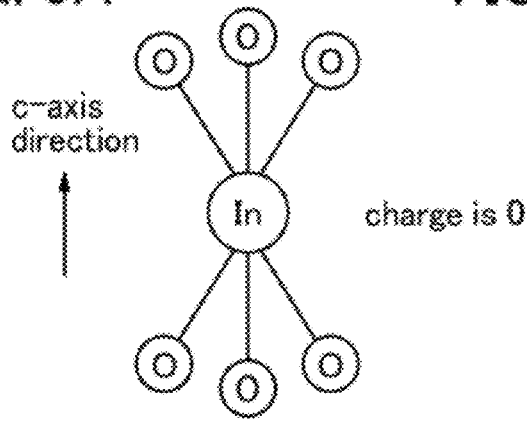
FIGS. 9A to 9E are diagrams showing a structure of an oxide semiconductor.

FIG. 9A illustrates a structure including one hexacoordinate In atom and six tetracoordinate oxygen (hereinafter referred to as tetracoordinate O) atoms proximate to the In atom. Here, a structure including one metal atom and oxygen atoms proximate thereto is referred to as a small group. The structure in FIG. 9A is actually an octahedral structure, but is illustrated as a planar structure for simplicity. Note that three tetracoordinate O atoms exist in each of an upper half and a lower half in FIG. 9A. In the small group illustrated in FIG. 9A, charge is 0.

Figure 9D:
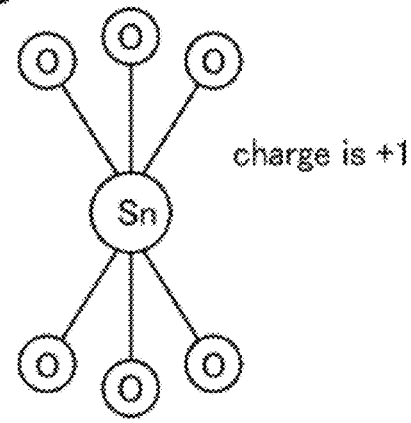
Figure 9B:
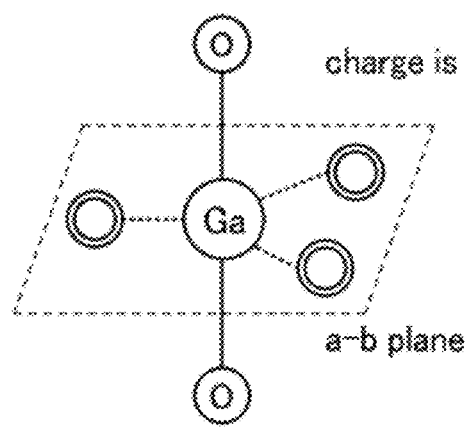

FIG. 9B illustrates a structure including one pentacoordinate Ga atom, three tricoordinate oxygen (hereinafter referred to as tricoordinate O) atoms proximate to the Ga atom, and two tetracoordinate O atoms proximate to the Ga atom. All the tricoordinate O atoms exist on the a-b plane. One tetracoordinate O atom exists in each of an upper half and a lower half in FIG. 9B. An In atom can also have the structure illustrated in FIG. 9B because an In atom can have five ligands. In the small group illustrated in FIG. 9B, charge is 0.

Figure 9E:
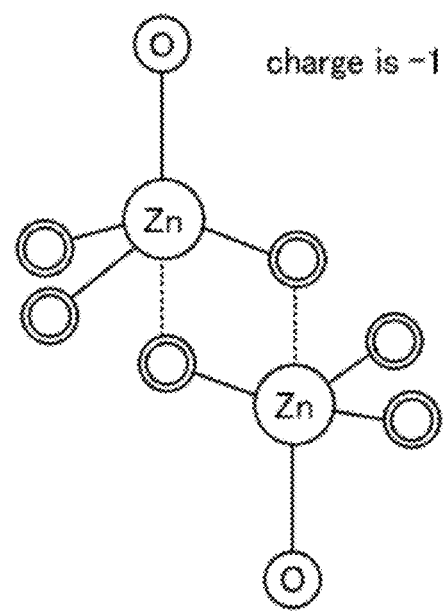
Figure 9C:
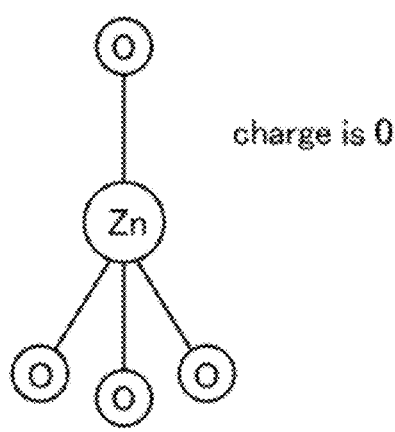

FIG. 9C illustrates a structure including one tetracoordinate Zn atom and four tetracoordinate O atoms proximate to the Zn atom. In FIG. 9C, one tetracoordinate O atom exists in an upper half and three tetracoordinate O atoms exist in a lower half. Alternatively, three tetracoordinate O atoms may exist in the upper half and one tetracoordinate O atom may exist in the lower half in FIG. 9C. In the small group illustrated in FIG. 9C, charge is 0.

FIG. 9D illustrates a structure including one hexacoordinate Sn atom and six tetracoordinate O atoms proximate to the Sn atom. In FIG. 9D, three tetracoordinate O atoms exist in each of an upper half and a lower half. In the small group illustrated in FIG. 9D, charge is +1.

FIG. 9E illustrates a small group including two Zn atoms. In FIG. 9E, one tetracoordinate O atom exists in each of an upper half and a lower half. In the small group illustrated in FIG. 9E, charge is −1.

Here, a plurality of small groups form a medium group, and a plurality of medium groups form a large group (also referred to as a unit cell).

Now, a rule of bonding between the small groups will be described. The three O atoms in the upper half with respect to the hexacoordinate In atom in FIG. 9A each have three proximate In atoms in the downward direction, and the three O atoms in the lower half each have three proximate In atoms in the upward direction. The one O atom in the upper half with respect to the pentacoordinate Ga atom in FIG. 9B has one proximate Ga atom in the downward direction, and the one O atom in the lower half has one proximate Ga atom in the upward direction. The one O atom in the upper half with respect to the tetracoordinate Zn atom in FIG. 9C has one proximate Zn atom in the downward direction, and the three O atoms in the lower half each have three proximate Zn atoms in the upward direction. In this manner, the number of the tetracoordinate O atoms above the metal atom is equal to the number of the metal atoms proximate to and below each of the tetracoordinate O atoms. Similarly, the number of the tetracoordinate O atoms below the metal atom is equal to the number of the metal atoms proximate to and above each of the tetracoordinate O atoms. Since the coordination number of the tetracoordinate O atom is 4, the sum of the number of the metal atoms proximate to and below the O atom and the number of the metal atoms proximate to and above the O atom is 4. Accordingly, when the sum of the number of tetracoordinate O atoms above a metal atom and the number of tetracoordinate O atoms below another metal atom is 4, the two kinds of small groups including the metal atoms can be bonded. For example, in the case where the hexacoordinate metal (In or Sn) atom is bonded through three tetracoordinate O atoms in the lower half, it is bonded to the pentacoordinate metal (Ga or In) atom or the tetracoordinate metal (Zn) atom.

A metal atom whose coordination number is 4, 5, or 6 is bonded to another metal atom through a tetracoordinate O atom in the c-axis direction. In addition to the above, a medium group can be formed in a different manner by combining a plurality of small groups so that the total charge of the layered structure is 0.

FIG. 10A illustrates a model of a medium group included in a layered structure of an In—Sn—Zn-based oxide. FIG. 10B illustrates a large group including three medium groups. Note that FIG. 10C illustrates an atomic arrangement in the case where the layered structure in FIG. 10B is observed from the c-axis direction.

In FIG. 10A, a tricoordinate O atom is omitted for simplicity, and a tetracoordinate O atom is illustrated by a circle; the number in the circle shows the number of tetracoordinate O atoms. For example, three tetracoordinate O atoms existing in each of an upper half and a lower half with respect to a Sn atom are denoted by circled 3. Similarly, in FIG. 10A, one tetracoordinate O atom existing in each of an upper half and a lower half with respect to an In atom is denoted by circled 1. FIG. 10A also illustrates a Zn atom proximate to one tetracoordinate O atom in a lower half and three tetracoordinate O atoms in an upper half, and a Zn atom proximate to one tetracoordinate O atom in an upper half and three tetracoordinate O atoms in a lower half.

In the medium group included in the layered structure of the In—Sn—Zn-based oxide in FIG. 10A, in the order starting from the top, a Sn atom proximate to three tetracoordinate O atoms in each of an upper half and a lower half is bonded to an In atom proximate to one tetracoordinate O atom in each of an upper half and a lower half, the In atom is bonded to a Zn atom proximate to three tetracoordinate O atoms in an upper half, the Zn atom is bonded to an In atom proximate to three tetracoordinate O atoms in each of an upper half and a lower half through one tetracoordinate O atom in a lower half with respect to the Zn atom, the In atom is bonded to a small group that includes two Zn atoms and is proximate to one tetracoordinate O atom in an upper half, and the small group is bonded to a Sn atom proximate to three tetracoordinate O atoms in each of an upper half and a lower half through one tetracoordinate O atom in a lower half with respect to the small group. A plurality of such medium groups are bonded, so that a large group is formed.

Here, charge for one bond of a tricoordinate O atom and charge for one bond of a tetracoordinate O atom can be assumed to be −0.667 and −0.5, respectively. For example, charge of a (hexacoordinate or pentacoordinate) In atom, charge of a (tetracoordinate) Zn atom, and charge of a (pentacoordinate or hexacoordinate) Sn atom are +3, +2, and +4, respectively. Accordingly, charge in a small group including a Sn atom is +1. Therefore, charge of −1, which cancels +1, is needed to form a layered structure including a Sn atom. As a structure having charge of −1, the small group including two Zn atoms as illustrated in FIG. 9E can be given. For example, with one small group including two Zn atoms, charge of one small group including a Sn atom can be cancelled, so that the total charge of the layered structure can be 0.

When the large group illustrated in FIG. 10B is repeated, an In—Sn—Zn-based oxide crystal ($In_2SnZn_3O_8$) can be obtained. Note that a layered structure of the obtained In—Sn—Zn—O-based crystal can be expressed as a composition formula, $In_2SnZn_2O_7(ZnO)_m$ (m is 0 or a natural number).

The above-described rule also applies to the following oxides: a four-component metal oxide such as an In—Sn—Ga—Zn-based oxide; a three-component metal oxide such as an In—Ga—Zn-based oxide (also referred to as IGZO), an In—Al—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; and the like.

Figure 11A:
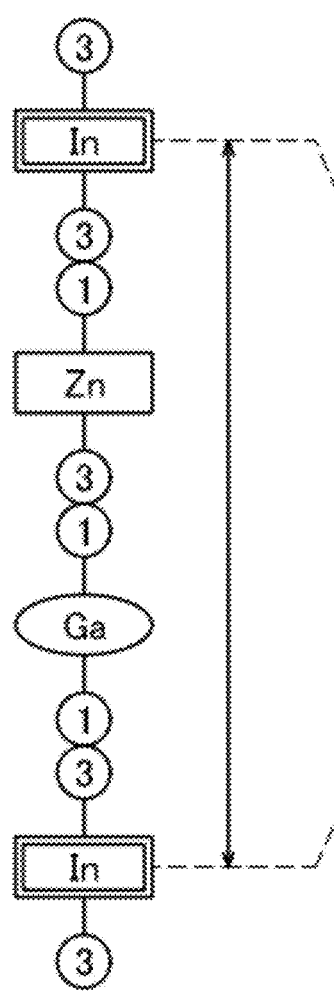
FIGS. 11A to 11C are diagrams showing a structure of an oxide semiconductor.

As an example, FIG. 11A illustrates a model of a medium group included in a layered structure of an In—Ga—Zn-based oxide.

In the medium group included in the layered structure of the In—Ga—Zn-based oxide in FIG. 11A, in the order starting from the top, an In atom proximate to three tetracoordinate O atoms in each of an upper half and a lower half is bonded to a Zn atom proximate to one tetracoordinate O atom in an upper half, the Zn atom is bonded to a Ga atom proximate to one tetracoordinate O atom in each of an upper half and a lower half through three tetracoordinate O atoms in a lower half with respect to the Zn atom, and the Ga atom is bonded to an In atom proximate to three tetracoordinate O atoms in each of an upper half and a lower half through one tetracoordinate O atom in a lower half with respect to the Ga atom. A plurality of such medium groups are bonded, so that a large group is formed.

Figure 11B:
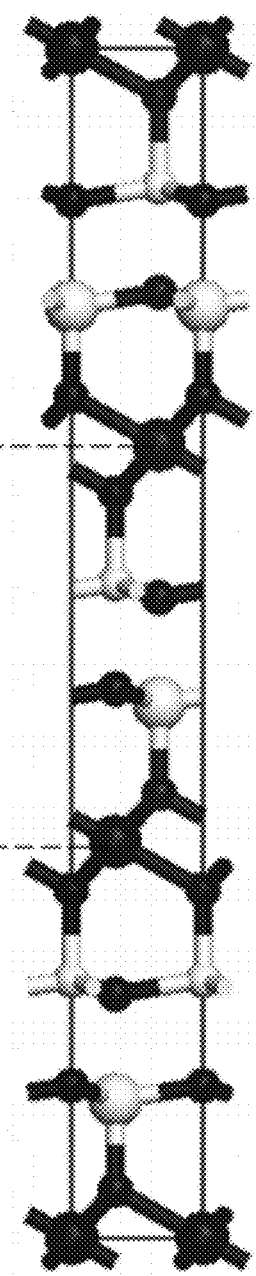
Figure 11C:
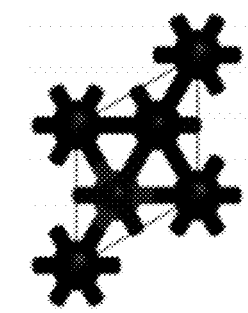

FIG. 11B illustrates a large group including three medium groups. Note that FIG. 11C illustrates an atomic arrangement in the case where the layered structure in FIG. 11B is observed from the c-axis direction.

Here, since charge of a (hexacoordinate or pentacoordinate) In atom, charge of a (tetracoordinate) Zn atom, and charge of a (pentacoordinate) Ga atom are +3, +2, and +3, respectively, charge of a small group including any of an In atom, a Zn atom, and a Ga atom is 0. As a result, the total charge of a medium group having a combination of such small groups is always 0.

In order to form the layered structure of the In—Ga—Zn-based oxide, a large group can be formed using not only the medium group illustrated in FIG. 11A but also a medium group in which the arrangement of the In atom, the Ga atom, and the Zn atom is different from that in FIG. 11A.

This embodiment can be implemented in combination with the aforementioned embodiment.

Embodiment 4

The DC-DC converter according to an embodiment of the present invention may be a step-up DC-DC converter which outputs the output voltage higher than an input voltage or a step-down DC-DC converter which outputs the output voltage lower than the input voltage.

Figure 12A:
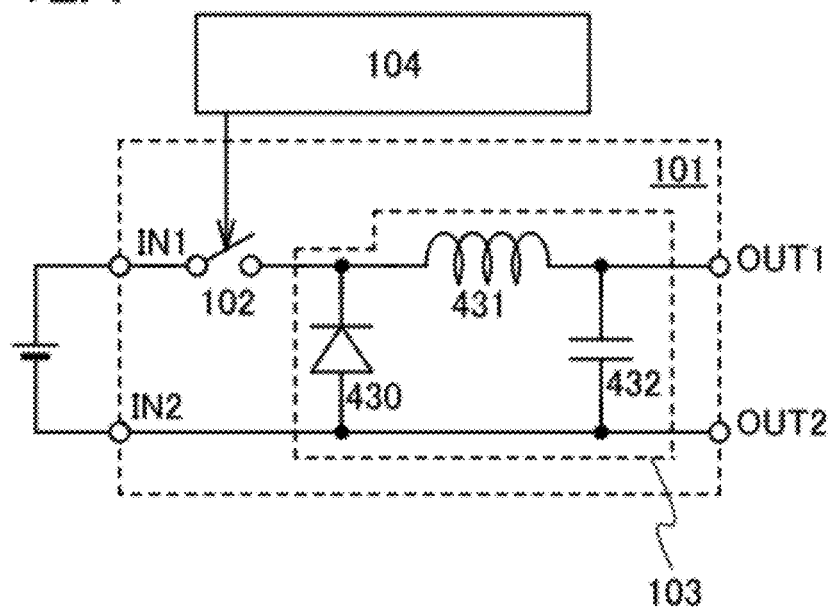
FIGS. 12A and 12B each illustrate an example of a configuration of a DC-DC converter.

FIG. 12A illustrates a structure of a step-down DC-DC converter according to an embodiment of the present invention. In the DC-DC converter illustrated in FIG. 12A, the constant-voltage generation portion 103 includes a diode 430, a coil 431, and a capacitor 432. Further, the DC-DC converter in FIG. 12A includes an input terminal IN1 supplied with the input voltage, an input terminal IN2 supplied with a reference voltage, an output terminal OUT1, and an output terminal OUT2.

The switching element 102 controls connection between the input terminal IN1 and a cathode of the diode 430. Specifically, one of a source and a drain of the switching element 102 is connected to the input terminal IN1 and the other of the source and the drain of the switching element 102 is connected to the cathode of the diode 430. One of terminals of the coil 431 is connected to the cathode of the diode 430 and the other of the terminals of the coil 431 is connected to the output terminal OUT1 of the DC-DC converter. The input terminal IN2 is connected to an anode of the diode 430 and the output terminal OUT2. One of electrodes of the capacitor 432 is connected to the output terminal OUT1 and the other of the electrodes of the capacitor 432 is connected to the output terminal OUT2.

In the DC-DC converter in FIG. 12A, when the switching element 102 is turned on, a voltage between the input terminal IN1 and the output terminal OUT1 is generated; thus, current flows through the coil 431. The coil 431 is magnetized by the current flow, and electromotive force in a direction opposite to that of the current flow is generated by self induction. Therefore, voltage which is obtained by decrease in the input voltage supplied to the input terminal IN1 is supplied to the output terminal OUT1. In other words, between the pair of electrodes of the capacitor 432, voltage corresponding to a difference between a reference voltage supplied from the input terminal IN2 and the voltage obtained by decrease in the input voltage is provided.

When the switching element 102 is turned off, a current path formed between the input terminal IN1 and the output terminal OUT1 is blocked. In the coil 431, the electromotive force in the direction preventing the change of the current, that is, in the direction opposite to that of electromotive force generated when the switching element 102 is on is generated. Therefore, the current that flows to the coil 431 is kept by voltage generated by the electromotive force. In other words, when the switching element 102 is off, a current path is formed between the output terminal OUT1 and the input terminal IN2 or the output terminal OUT2 through the coil 431 and/or the diode 430. Accordingly, voltage applied between the pair of electrodes of the capacitor 432 is held to some extent.

Note that voltage held in the capacitor 432 corresponds to the voltage output from the output terminal OUT1. In the above operation, as a percentage of on time of the switching element 102 is higher, voltage held in the capacitor 432 becomes close to a difference between the reference voltage and the input voltage. Accordingly, the voltage can be decreased so that the output voltage close to that of the input voltage is obtained. In contrast, as a percentage of off time of the switching element 102 is higher, a difference between the reference voltage and the voltage held in the capacitor 432 becomes smaller. Accordingly, the voltage can be decreased so that the output voltage close to that of the reference voltage is obtained.

Figure 12B:
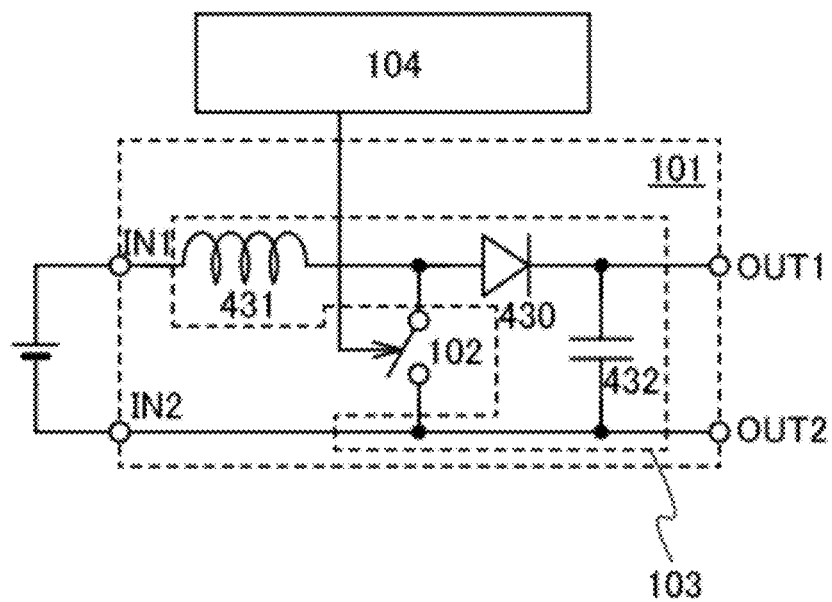

Next, FIG. 12B illustrates a structure of the step-up DC-DC converter according to an embodiment of the present invention.

In the DC-DC converter illustrated in FIG. 12B, the constant-voltage generation portion 103 includes the diode 430, the coil 431, and the capacitor 432. Further, the DC-DC converter in FIG. 12B includes the input terminal IN1 supplied with the input voltage, the input terminal IN2 supplied with a reference voltage, the output terminal OUT1, and the output terminal OUT2.

The one of the terminals of the coil 431 is connected to the input terminal IN1 and the other of the terminals of the coil 431 is connected to the anode of the diode 430. The switching element 102 controls connection between the input terminal IN2 or the output terminal OUT2 and a node between the coil 431 and the diode 430. Specifically, the one of the source and the drain of the switching element 102 is connected to the node between the coil 431 and the diode 430, and the other of the source and the drain of the switching element 102 is connected to the input terminal IN2 and the output terminal OUT2. The cathode of the diode 430 is connected to the output terminal OUT1. The one of the pair of electrodes of the capacitor 432 is connected to the output terminal OUT1 and the other of the electrodes of the capacitor 432 is connected to the output terminal OUT2.

In the DC-DC converter illustrated in FIG. 12B, when the switching element 102 is turned on, current flows to the coil 431 because of a voltage between the input terminal IN1 and the input terminal IN2. The coil 431 is magnetized because the current flows thereto. Note that in the coil 431, electromotive force in an opposite direction to that of the current flow is generated by self induction, so that the current is gradually increased.

Next, when the switching element 102 is turned off, a current path formed between the input terminal IN1 and the input terminal IN2 is blocked. In the coil 431, the electromotive force in the direction preventing the change of the current, that is, in the direction opposite to that of electromotive force generated when the switching element 102 is on is generated. Therefore, voltage corresponding to the current flowing to the coil 431 when the switching element 102 is on is generated between the pair of the terminals of the coil 431. Then, current flowing through the coil 431 is held by voltage generated between the terminals. In other words, when the switching element 102 is off, a current path is formed between the input terminal IN1 and the output terminal OUT1 through the coil 431 and the diode 430. At this time, voltage which is the sum of the input voltage applied to the input terminal IN1 and the voltage generated between the terminals of the coil 431 is supplied to the output terminal OUT1, and the voltage is output from the DC-DC converter. Voltage corresponding to a difference between the voltage of the output terminal OUT1 and the reference voltage is held between the electrodes of the capacitor 432.

In the above operation, when a percentage of on time of the switching element 102 is high, current flowing through the coil 431 is large. Therefore, voltage between the terminals of the coil 431 is high when the switching element 102 is turned off, which allows the boosting in voltage so that a difference between the output voltage and the input voltage is increased. In contrast, as a percentage of off time of the switching element 102 is higher, current flowing to the coil 431 is small. Therefore, voltage between the terminals of the coil 431 is low when the switching element 102 is turned off, which allows the boosting in voltage so that a difference between the output voltage and the input voltage is reduced.

Figure 13A:
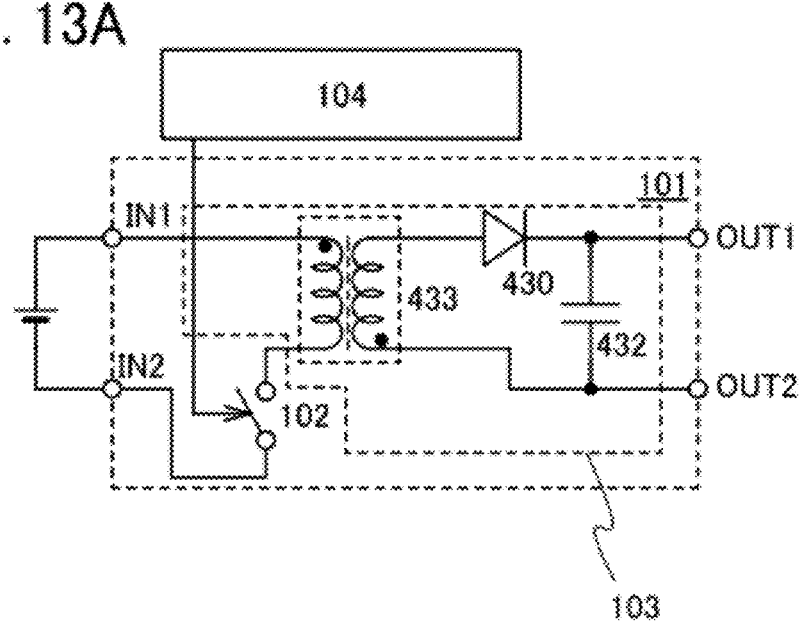
FIGS. 13A and 13B each illustrate an example of a configuration of a DC-DC converter.

FIG. 13A illustrates a structure of a fly-back DC-DC converter. In the DC-DC converter in FIG. 13A, the constant-voltage generation portion 103 includes the diode 430, the capacitor 432, and a transformer 433. Further, the DC-DC converter in FIG. 13A includes the input terminal IN1 supplied with an input voltage, the input terminal IN2 supplied with a reference voltage, the output terminal OUT1, and the output terminal OUT2.

The transformer 433 includes a first coil and a second coil in which a common core is provided for each of the centers of the coils. The switching element 102 controls connection between the input terminal IN2 and one of terminals of the first coil of the transformer 433. Specifically, one of a source and a drain of the switching element 102 is connected to the input terminal IN2, and the other of the source and the drain of the switching element 102 is connected to the one of the terminals of the first coil of the transformer 433. The other of the terminals of the first coil of the transformer 433 is connected to the input terminal IN1.

One of terminals the second coil of the transformer 433 is connected to the anode of the diode 430 and the other of the terminals of the second coil is connected to the output terminal OUT2. The cathode of the diode 430 is connected to the output terminal OUT1. One of electrodes of the capacitor 432 is connected to the output terminal OUT1 and the other of the electrodes of the capacitor 432 is connected to the output terminal OUT2.

Figure 13B:
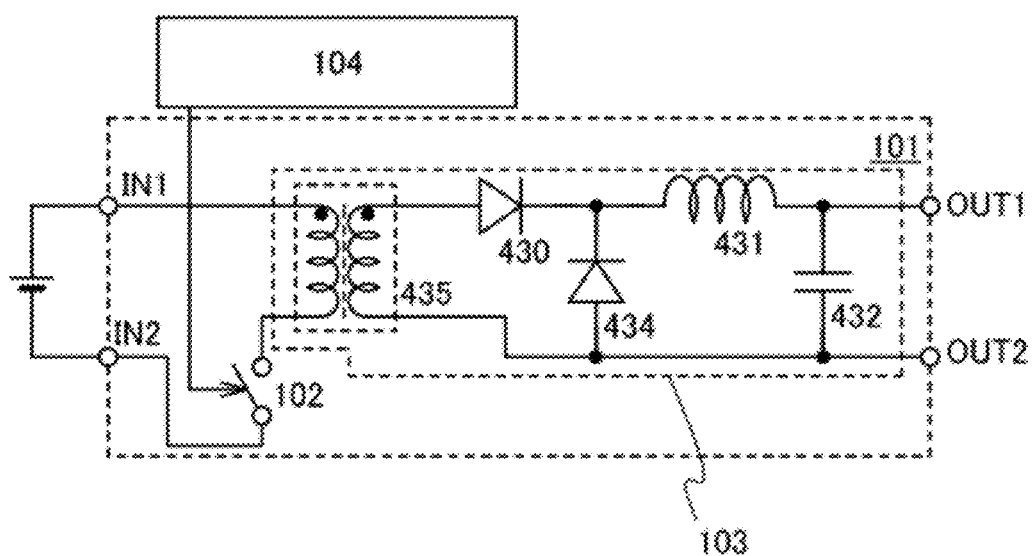

FIG. 13B illustrates a structure of a forward DC-DC converter according to an embodiment of the present invention. In the DC-DC converter in FIG. 13B, the constant-voltage generation portion 103 includes the diode 430, a diode 434, the coil 431, the capacitor 432, and a transformer 435. Further, the DC-DC converter in FIG. 13B includes the input terminal IN1 supplied with the input voltage, the input terminal IN2 supplied with a reference voltage, the output terminal OUT1, and the output terminal OUT2.

Like the transformer 433 in FIG. 13A, the transformer 435 includes a first coil and a second coil in which a common core is provided for each of the centers of the coils. Note that in the transformer 433, the start end of the first coil and the start end of the second coil are on the opposite side to each other; on the other hand, the start end of the first coil and the start end of the second coil are on the same side in the transformer 435.

The switching element 102 controls connection between the input terminal IN2 and one of terminals of the first coil of the transformer 435. Specifically, the one of the source and the drain of the switching element 102 is connected to the input terminal IN2, and the other of the source and the drain of the switching element 102 is connected to the one of the terminals of the first coil of the transformer 435. The other of the terminals of the first coil of the transformer 435 is connected to the input terminal IN1.

Further, one of terminals of the second coil of the transformer 435 is connected to the anode of the diode 430 and the other of the terminals of the second coil is connected to the output terminal OUT2. The cathode of the diode 430 is connected to a cathode of the diode 434 and the one of the terminals of the coil 431. An anode of the diode 434 is connected to the output terminal OUT2. The other of the terminals of the coil 431 is connected to the output terminal OUT1. The one of electrodes of the capacitor 432 is connected to the output terminal OUT1 and the other of the electrodes of the capacitor 432 is connected to the output terminal OUT2.

This embodiment can be implemented by being combined as appropriate with any of the embodiments.

Embodiment 5

In this embodiment, an example of a light-emitting device which is one of semiconductor devices according to an embodiment of the present invention will be described.

Figure 14A:
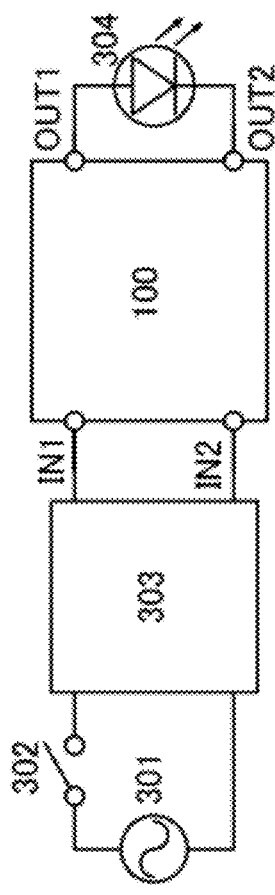
FIGS. 14A and 14B each illustrate a semiconductor device including a DC-DC converter.

FIG. 14A illustrates an example of a structure of a light-emitting device. The light-emitting device in FIG. 14A includes an AC power source 301, a switch 302, a rectification circuit 303, the DC-DC converter 100, and a light-emitting element 304. The rectification circuit 303 and the DC-DC converter 100 form a power supply circuit.

Specifically, in the light-emitting device in FIG. 14A, AC voltage from the AC power source 301 is supplied to the rectification circuit 303 through the switch 302, and rectified. DC voltage obtained by the rectification is input to the DC-DC converter 100 and output after the level is adjusted. Description in the above embodiments can be referred to for specific configuration and operation of the DC-DC converter 100.

The voltage output from the DC-DC converter 100 is supplied to the light-emitting element 304, so that the light-emitting element 304 emits light. As the light-emitting element 304, various light sources such as a light-emitting diode (LED) and an organic light-emitting element (OLED) can be used.

Although in FIG. 14A, a light-emitting device in which the AC power source 301 is used as a power source is illustrated, the present invention is not limited thereto. As the power source, a DC power source may be used instead of an AC power source. Note that in the case of using a DC power source, the rectification circuit 303 is not necessarily provided.

In addition, although in FIG. 14A, a structure of a light-emitting device in which the AC power source 301 is used as a power source is illustrated, a light-emitting device according to an embodiment of the present invention does not necessarily include a power source as its component.

Figure 14B:
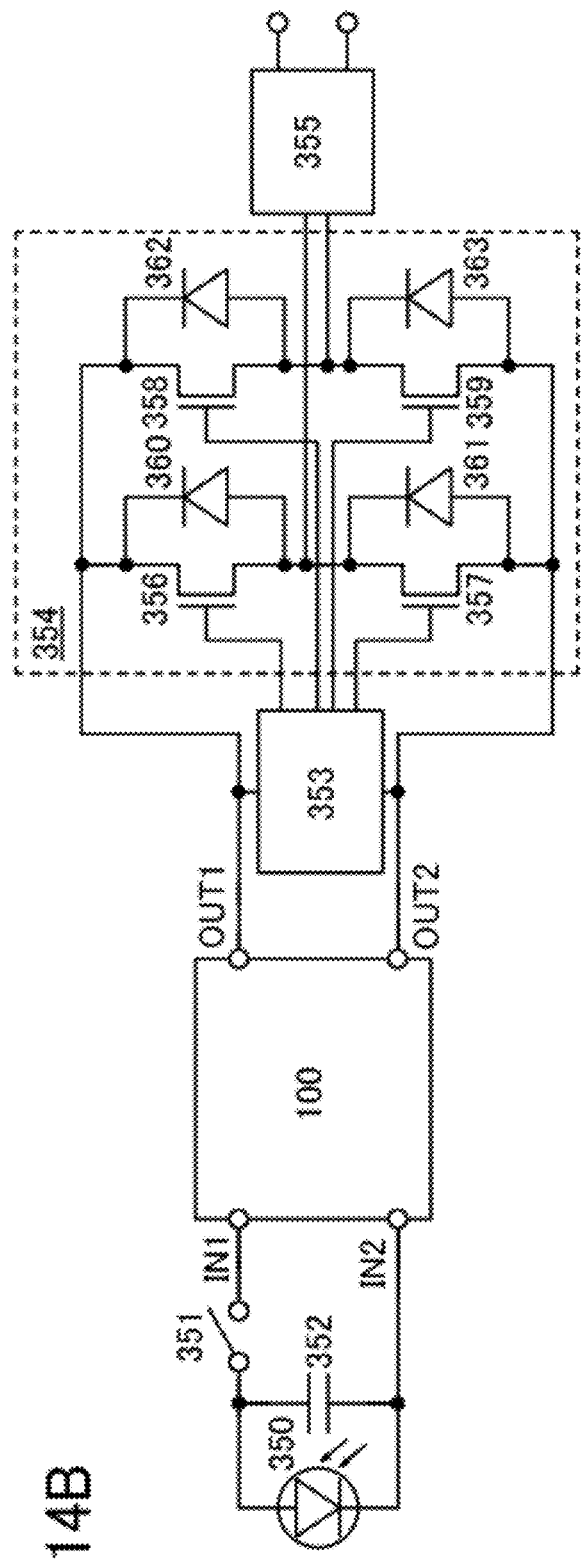

FIG. 14B illustrates one mode of a structure of a solar cell which is one of semiconductor devices.

The solar cell in FIG. 14B includes a photodiode 350, a switch 351, a capacitor 352, the DC-DC converter 100, a pulse width modulation circuit 353, an inverter 354, and a band pass filter 355.

Specifically, in the solar cell in FIG. 14B, voltage is generated when light is delivered to the photodiode 350. The voltage smoothed by the capacitor 352 is input to the DC-DC converter 100 through the switch 351. Note that with the capacitor 352, the pulsed current generated by switching of the switch 351 can be prevented from flowing through the photodiode 350.

Then, the voltage input to the DC-DC converter 100 is output after the voltage is adjusted by the DC-DC converter 100. Description in the above embodiments can be referred to for specific configuration and operation of the DC-DC converter 100.

The voltages output from the output terminals OUT1 and OUT2 of the DC-DC converter 100 are DC voltages. The inverter 354 converts the DC voltage output from the DC-DC converter 100 to AC voltage, and outputs. FIG. 14B illustrates an example of a structure in which the inverter 354 includes four transistors 356 to 359 and four diodes 360 to 363.

Specifically, one of a source and a drain of the transistor 356 is connected to the output terminal OUT1 of the DC-DC converter 100 and the other of the source and the drain of the transistor 356 is connected to a first terminal of the transistor 357. A second terminal of the transistor 357 is connected to the output terminal OUT2 of the DC-DC converter 100. A first terminal of the transistor 358 is connected to the output terminal OUT1 of the DC-DC converter 100 and a second terminal of the transistor 358 is connected to a first terminal of the transistor 359. A second terminal of the transistor 359 is connected to the output terminal OUT2 of the DC-DC converter 100. The diodes 360 to 363 are connected to the transistors 356 to 359 in parallel respectively. Specifically, the one of the source and the drains of the transistors 356 to 359 are connected to anodes of the diodes 360 to 363, respectively. The second terminals of the transistors 356 to 359 are connected to cathodes of the diodes 360 to 363.

To the pulse width modulation circuit 353, the voltage output from the DC-DC converter 100 is supplied. The pulse width modulation circuit 353 is operated by application of the voltage and generates a signal for controlling switching of the transistors 356 to 359.

The transistors 356 to 359 perform switching in accordance with the signal from the pulse width modulation circuit 353, whereby AC voltage with a PWM waveform is output from a node in which the other of the source and the drain of the transistor 356 and the one of the source and the drain of the transistor 357 in the inverter 354 are connected and a node in which the other of the source and the drain of the transistor 358 and the one of the source and the drain of the transistor 359 in the inverter 354 are connected.

Then, a high-frequency component is removed from the AC voltage output from the inverter 354 by using the band pass filter 355, whereby AC voltage with a sine wave can be obtained.

This embodiment can be implemented by being combined as appropriate with any of the embodiments.

Example 1

Further, an electronic device with low power consumption can be provided with the use of a DC-DC converter, a power source circuit, or a semiconductor device according to one embodiment of the present invention. In particular, the case of a portable electronic appliance to which electric power cannot be easily supplied constantly, continuous use time becomes longer by adding the DC-DC converter, the power source circuit, or the semiconductor device relating to an embodiment of the present invention as a component, which is an advantage.

The semiconductor device according to one embodiment of the present invention can be used for display devices, laptops, or image reproducing devices provided with recording media (typically, devices which reproduce the content of recording media and have displays for displaying the reproduced images such as digital versatile discs (DVDs)). Other than the above, as an electronic appliance which can use the semiconductor device according to one embodiment of the present invention, mobile phones, game machines including portable game machines, portable information terminals, e-book readers, video cameras, digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like can be given. Specific examples of such electronic devices are illustrated in FIGS. 15A to 15F.

Figure 15A:
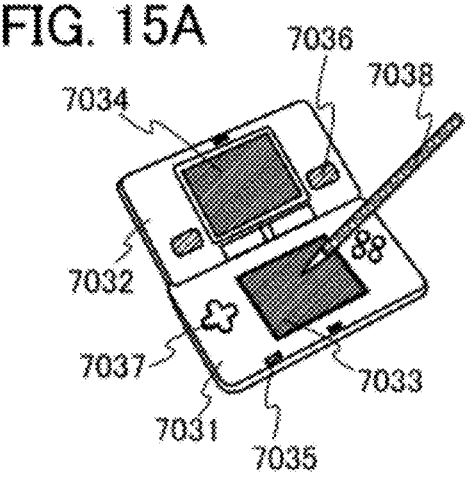
FIGS. 15A to 15F illustrate electronic devices.

FIG. 15A illustrates a portable game machine including a housing 7031, a housing 7032, a display portion 7033, a display portion 7034, a microphone 7035, speakers 7036, an operation key 7037, a stylus 7038, and the like. The DC-DC converter, the power source circuit, and the semiconductor device according to an embodiment of the present invention can be used for an integrated circuit which controls driving of the portable game machine. With the use of the DC-DC converter, the power source circuit, and the semiconductor device according to one embodiment of the present invention for the integrated circuit for controlling driving of the portable game machine, a portable game machine with low power consumption can be provided. Although the portable game machine illustrated in FIG. 15A has the two display portions 7033 and 7034, the number of display portions included in the portable game machine is not limited to two.

Figure 15B:
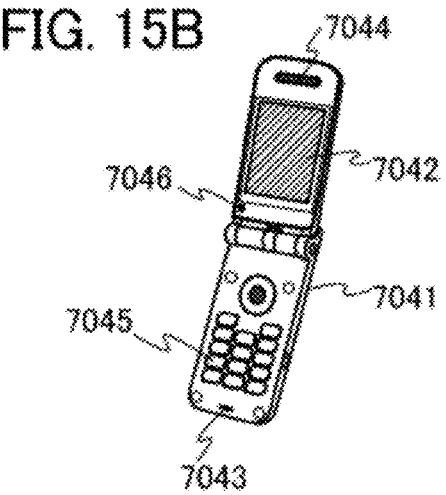

FIG. 15B illustrates a mobile phone including a housing 7041, a display portion 7042, an audio-input portion 7043, an audio-output portion 7044, operation keys 7045, a light-receiving portion 7046, and the like. Light received in the light-receiving portion 7046 is converted into electrical signals, whereby external images can be loaded. The DC-DC converter, the power source circuit, and the semiconductor device according to an embodiment of the present invention can be used for an integrated circuit which controls driving of the mobile phone. With the use of the DC-DC converter, the power source circuit, and the semiconductor device according to an embodiment of the present invention for the integrated circuit for controlling driving of the mobile phone, a mobile phone with low power consumption can be provided.

Figure 15C:
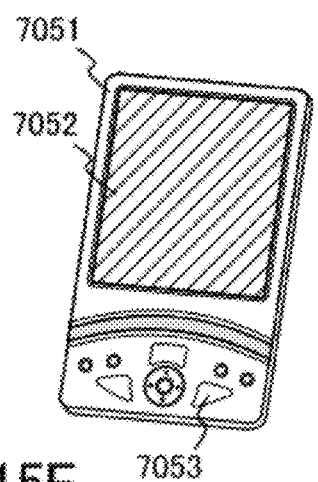

FIG. 15C illustrates a portable information terminal including a housing 7051, a display portion 7052, operation keys 7053, and the like. The DC-DC converter, the power source circuit, and the semiconductor device according to an embodiment of the present invention can be used for an integrated circuit for controlling driving of the portable information terminal. With the use of the DC-DC converter, the power source circuit, and the semiconductor device according to an embodiment of the present invention for the integrated circuit for controlling driving of the portable information terminal, a portable information terminal with low power consumption can be provided.

Figure 15D:
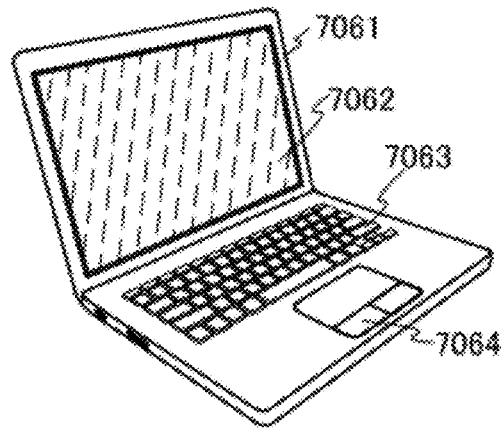

FIG. 15D illustrates a laptop personal computer including a housing 7061, an image display portion 7062, a keyboard 7063, a pointing device 7064, and the like. The DC-DC converter, the power source circuit, and the semiconductor device according to an embodiment of the present invention can be used for an integrated circuit for controlling driving of the laptop personal computer. With the use of the DC-DC converter, the power source circuit, and the semiconductor device according to an embodiment of the present invention for the integrated circuit for controlling driving of the laptop personal computer, a laptop personal computer with low power consumption can be provided.

Figure 15E:
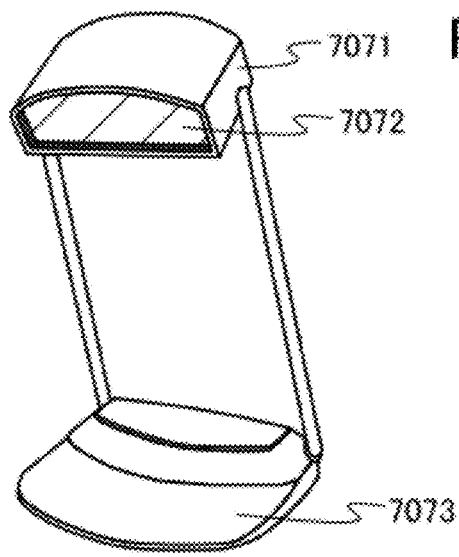

The table lighting device in FIG. 15E includes a housing 7071, a light source 7072, a support base 7073, and the like. The DC-DC converter, the power source circuit, and the semiconductor device according to an embodiment of the present invention can be used for an integration circuit for controlling driving of the lighting device. The light emitting device which is one of a semiconductor device according to one embodiment of the present invention can be used for the light source 7072 and a driving circuit for controlling the operation of the light source 7072. With the use of the DC-DC converter, the power source circuit, and the semiconductor device according to an embodiment of the present invention, a lighting device with low power consumption can be provided.

Figure 15F:
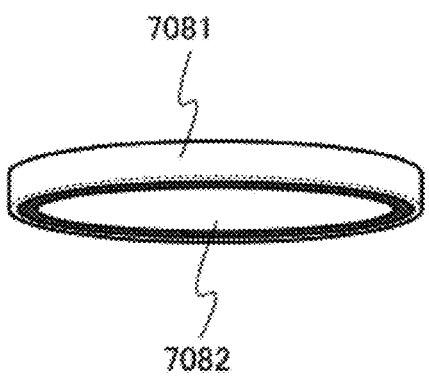

FIG. 15F is an installation lighting device including a housing 7081, a light source 7082, and the like. The DC-DC converter, the power source circuit, and the semiconductor device according to an embodiment of the present invention can be used for an integrated circuit for controlling the driving of the lighting device. The light emitting device which is one of a semiconductor device according to one embodiment of the present invention can be used for the light sources 7082 and a driving circuit for controlling the operation of the light sources 7082. With the use of the DC-DC converter, the power source circuit, and the semiconductor device according to an embodiment of the present invention, a lighting device with low power consumption can be provided.

This embodiment can be implemented by being combined as appropriate with any of the above-described embodiments.

This application is based on Japanese Patent Application serial no. 2011-121231 filed with Japan Patent Office on May 31, 2011, the entire contents of which are hereby incorporated by reference.

What is claimed is:

1. A DC-DC converter comprising:
   a switching element;
   a control circuit configured to control a duty ratio of switching of the switching element; and
   a constant-voltage generation portion configured to generate an output voltage with a level corresponding to the duty ratio, wherein supply of an input voltage is controlled by the switching element,
   wherein the control circuit comprises:
      a first AD converter configured to convert the input voltage;
      a second AD converter configured to convert the output voltage;
      a signal processing circuit configured to determine the duty ratio in accordance with a digital value of the output voltage;
      a pulse modulation circuit configured to generate a signal for controlling switching of the switching element in accordance with the duty ratio; and
      a power supply control circuit configured to determine whether or not a power supply voltage is supplied to the signal processing circuit,
   wherein the signal processing circuit comprises a memory device configured to store the duty ratio comprising:
      a memory element;
      a transistor; and
      a capacitor operationally connected to the memory element through the transistor,
   wherein the memory element comprises:
      a first logic element; and
      a second logic element,
   wherein an output terminal of the first logic element is electrically connected to an input terminal of the second logic element.

2. A power source circuit comprising the DC-DC converter according to claim 1 and a rectification circuit.

3. A semiconductor device comprising the DC-DC converter according to claim 1.

4. The DC-DC converter according to claim 1,
   wherein the transistor comprises an oxide semiconductor in a channel formation region, and
   wherein a band gap of the oxide semiconductor is larger than or equal to 2 eV.

5. A DC-DC converter comprising:
   a switching element;
   a constant-voltage generation portion configured to generate an output voltage, wherein an input voltage is supplied to the constant-voltage generation portion through the switching element; and
   a control circuit comprising:
      a first AD converter configured to convert the input voltage;
      a second AD converter configured to convert the output voltage;
      a signal processing circuit configured to determine a duty ratio of switching of the switching element in accordance with a digital value of the output voltage;
      a pulse modulation circuit configured to generate a signal for controlling the switching of the switching element; and
      a power supply control circuit configured to control a power supply voltage which is supplied to the signal processing circuit in accordance with a digital value of the input voltage and the digital value of the output voltage,
   wherein the signal processing circuit comprises a memory device comprising:
      a memory element configured to store data of the duty ratio;
      a transistor; and
      a capacitor electrically connected to the memory element through the transistor, and configured to store the data of the duty ratio,
   wherein the memory element comprises:
      a first logic element; and
      a second logic element,
   wherein an output terminal of the first logic element is electrically connected to an input terminal of the second logic element.

6. A power source circuit comprising the DC-DC converter according to claim 5 and a rectification circuit.

7. A semiconductor device comprising the DC-DC converter according to claim 5.

8. The DC-DC converter according to claim 5,
   wherein the transistor comprises an oxide semiconductor in a channel formation region, and
   wherein a band gap of the oxide semiconductor is larger than or equal to 2 eV.

9. A DC-DC converter comprising:
   a switching element;
   a control circuit for controlling a duty ratio of switching of the switching element; and
   a constant-voltage generation portion for generating an output voltage with a level corresponding to the duty ratio, wherein supply of an input voltage is controlled by the switching element,
   wherein the control circuit comprises:
      a first AD converter obtaining a digital value of the input voltage with the use of an analog value of the input voltage;
      a second AD converter obtaining a digital value of the output voltage with the use of an analog value of the output voltage;

a signal processing circuit for determining the duty ratio with the use of the digital value of the output voltage;

a pulse modulation circuit for generating a signal for controlling switching of the switching element in accordance with the duty ratio; and a power supply control circuit for determining whether or not a power supply voltage is supplied to the signal processing circuit in accordance with the digital value of the input voltage and the digital value of the output voltage, wherein the signal processing circuit comprises a memory device for storing the duty ratio, wherein the memory device comprises:
 a memory element in which data is stored by supply of the power supply voltage;
 a capacitor for holding a charge in accordance with the data held in the memory element; and
 a transistor for controlling supply, holding, and discharge of the charge in the capacitor, wherein the memory element comprises:
 a first logic element; and
 a second logic element, and wherein an output terminal of the first logic element is electrically connected to an input terminal of the second logic element.

10. The DC-DC converter according to claim 9, wherein the first logic element and the second logic element are inverters or clocked inverters.

11. A power source circuit comprising the DC-DC converter according to claim 9 and a rectification circuit.

12. A semiconductor device comprising the DC-DC converter according to claim 9.

13. The DC-DC converter according to claim 9,
 wherein the transistor comprises an oxide semiconductor, and
 wherein a band gap of the oxide semiconductor is larger than or equal to 2 eV.

14. The DC-DC converter according to claim 9,
 wherein the first logic element is configured to invert a logical value of a signal input to the first logic element, and
 wherein the second logic element is configured to invert a logical value of a signal inputted to the second logic element.

* * * * *